(12) United States Patent
Kondo et al.

(10) Patent No.: US 12,455,350 B2
(45) Date of Patent: Oct. 28, 2025

(54) AXIAL DEVIATION ESTIMATING DEVICE

(71) Applicant: DENSO CORPORATION, Kariya (JP)

(72) Inventors: Katsuhiko Kondo, Nisshin (JP); Akiyoshi Mizutani, Kariya (JP); Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 384 days.

(21) Appl. No.: 17/658,392

(22) Filed: Apr. 7, 2022

(65) Prior Publication Data

US 2022/0229168 A1 Jul. 21, 2022

Related U.S. Application Data

(63) Continuation of application No. PCT/JP2020/038209, filed on Oct. 8, 2020.

(30) Foreign Application Priority Data

Oct. 9, 2019 (JP) .................. 2019-186317

(51) Int. Cl.
*G01S 7/40* (2006.01)
*G01B 15/08* (2006.01)
(Continued)

(52) U.S. Cl.
CPC ............ *G01S 7/4026* (2013.01); *G01B 15/08* (2013.01); *G01S 13/42* (2013.01); *G01S 13/931* (2013.01)

(58) Field of Classification Search
CPC ...... G01S 13/42; G01S 13/931; G01S 7/2955; G01S 13/86; G01S 13/867; G01S 7/40–4034; G01B 15/08; G01B 21/30
See application file for complete search history.

(56) References Cited

U.S. PATENT DOCUMENTS

2004/0080449 A1 4/2004 Horibe
2005/0116854 A1* 6/2005 Beez ............... H01Q 19/062
342/107
(Continued)

FOREIGN PATENT DOCUMENTS

DE 102016009808 A1 * 2/2017 ............... B60T 7/12
JP 2010-210483 A 9/2010
(Continued)

OTHER PUBLICATIONS

DE-102016009808-A1 translation (Year: 2017).*

*Primary Examiner* — Matthew M Barker
(74) *Attorney, Agent, or Firm* — Maschoff Brennan

(57) ABSTRACT

An axial misalignment estimation apparatus, mounted in a moving body, acquires reflection point information for each of reflection points detected by a radar apparatus, extracts, from the reflection points, at least a single road-surface reflection point detected by reflection on a road surface, based on the reflection point information. Based on the reflection point information, the axial misalignment estimation apparatus identifies, for each road-surface reflection point, apparatus system coordinates based on coordinate axes of the radar apparatus, and estimates an axial misalignment angle and a height of the radar apparatus using a relational expression established between at least two unknown parameters and at least two elements included in the apparatus system coordinates of the road-surface reflection point. The unknown parameters include the axial misalignment angle being a misalignment angle of a coordinate axis of the radar apparatus around a target axis, and a mounting height of the radar apparatus.

11 Claims, 15 Drawing Sheets

(51) Int. Cl.
G01S 13/42 (2006.01)
G01S 13/931 (2020.01)

(56) References Cited

U.S. PATENT DOCUMENTS

| | | | |
|---|---|---|---|
| 2012/0235851 A1* | 9/2012 | Park | G01S 7/4052 |
| | | | 342/70 |
| 2016/0124076 A1 | 5/2016 | Nakatani et al. | |
| 2016/0161597 A1* | 6/2016 | Treptow | G01S 13/424 |
| | | | 342/174 |
| 2017/0363718 A1 | 12/2017 | Ishimori | |

FOREIGN PATENT DOCUMENTS

| | | | |
|---|---|---|---|
| JP | 2015075382 A | 4/2015 | |
| JP | 2016197081 A | 11/2016 | |
| JP | 2017-167839 A | 9/2017 | |
| JP | 2019-518946 A | 7/2019 | |
| JP | 2021060369 A | 4/2021 | |
| JP | 2021060370 A | 4/2021 | |

* cited by examiner

○ : REFLECTION POINT

AXIAL MISALIGNMENT

○ ROAD-SURFACE REFLECTION POINT

○ ROAD-SURFACE REFLECTION POINT

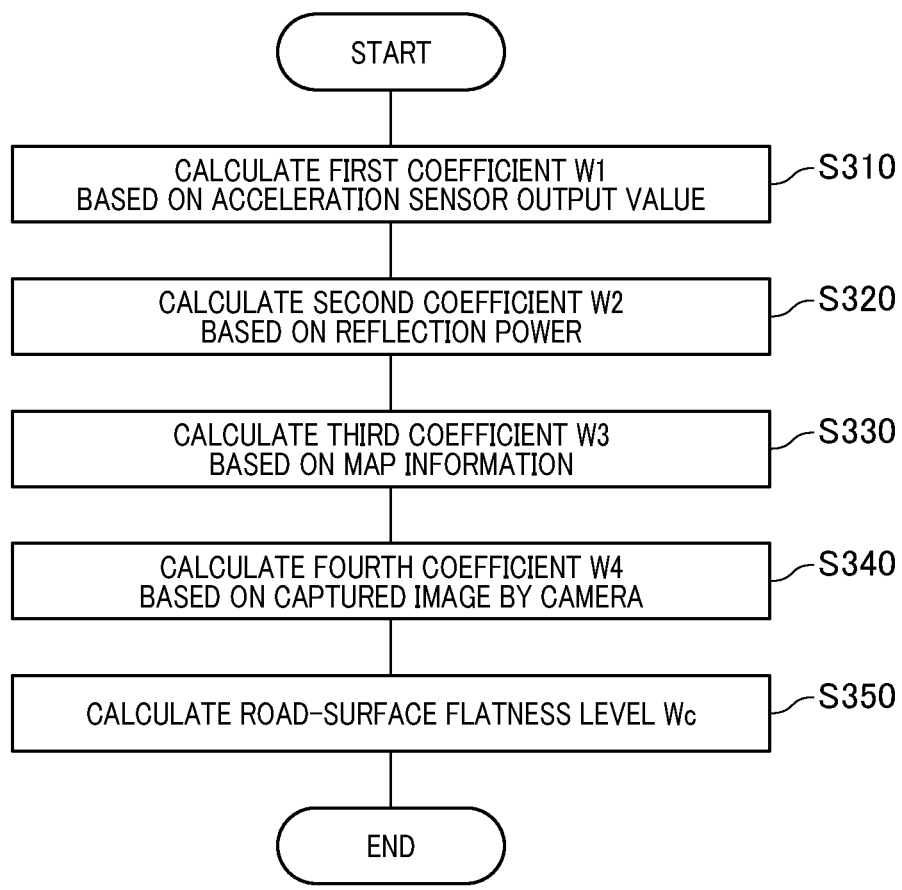

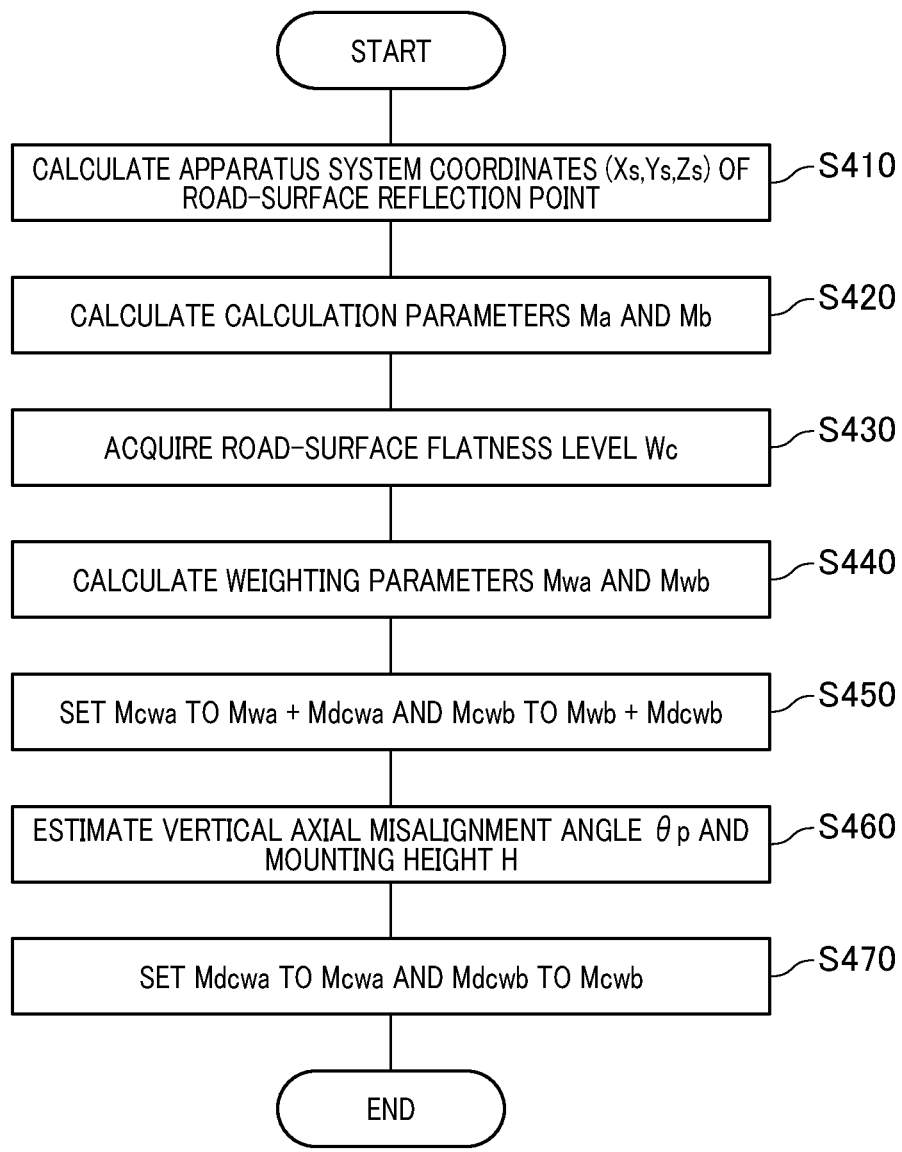

AXIAL DEVIATION ESTIMATING DEVICE

CROSS-REFERENCE TO RELATED APPLICATION

The present application is a continuation application of International Application No. PCT/JP2020/038209, filed on Oct. 8, 2020, which claims priority to Japanese Patent Application No. 2019-186317, filed on Oct. 9, 2019. The contents of these applications are incorporated herein by reference in their entirety.

BACKGROUND

Technical Field

The present disclosure relates to a technology for estimating axial misalignment of a radar apparatus that detects an orientation or a relative speed of an object.

Related Art

In an onboard radar apparatus, so-called axial misalignment in which a center axis of a radar beam becomes misaligned as a result of a setup state changing for some reason may occur. For example, the following technology is known. In the technology, an axial misalignment angle of an onboard radar apparatus is estimated based on a reception strength of a reflected wave from near a vehicle being highest when an axial misalignment occurs.

SUMMARY

One aspect of the present disclosure provides an axial misalignment estimation apparatus that is mounted in a moving body. The axial misalignment apparatus acquires reflection point information for each of a plurality of reflection points that are detected by a radar apparatus. The reflection point information includes at least a horizontal angle and a vertical angle that are an orientation angle of the reflection point and determined with reference to a beam direction that is a direction along a center axis of a radar beam, and a distance between the radar apparatus and the reflection point. The axial misalignment apparatus extracts, from the plurality of reflection points, at least a single road-surface reflection point that is detected by reflection on a road surface, based on at least the reflection point information. The axial misalignment apparatus identifies, for each road-surface reflection point, apparatus system coordinates that are three-dimensional coordinates that are based on coordinate axes of the radar apparatus, based on the reflection point information. The axial misalignment apparatus estimates an axial misalignment angle and a height of the radar apparatus using a relational expression that is established between at least two unknown parameters and at least two elements. The at least two unknown parameters include the axial misalignment angle and a mounting height of the radar apparatus. The axial misalignment angle is a misalignment angle of a coordinate axis of the radar apparatus around a target axis that is one of a horizontal axis and a moving-direction axis that are coordinate axes of the moving body. The at least two elements are included in the apparatus system coordinates of the road-surface reflection point.

BRIEF DESCRIPTION OF THE DRAWINGS

In the accompanying drawings:

FIG. 17 is a flowchart illustrating a flatness level process; and

FIG. 18 is a flowchart illustrating a weighting process.

DESCRIPTION OF THE EMBODIMENTS

Figure 1:
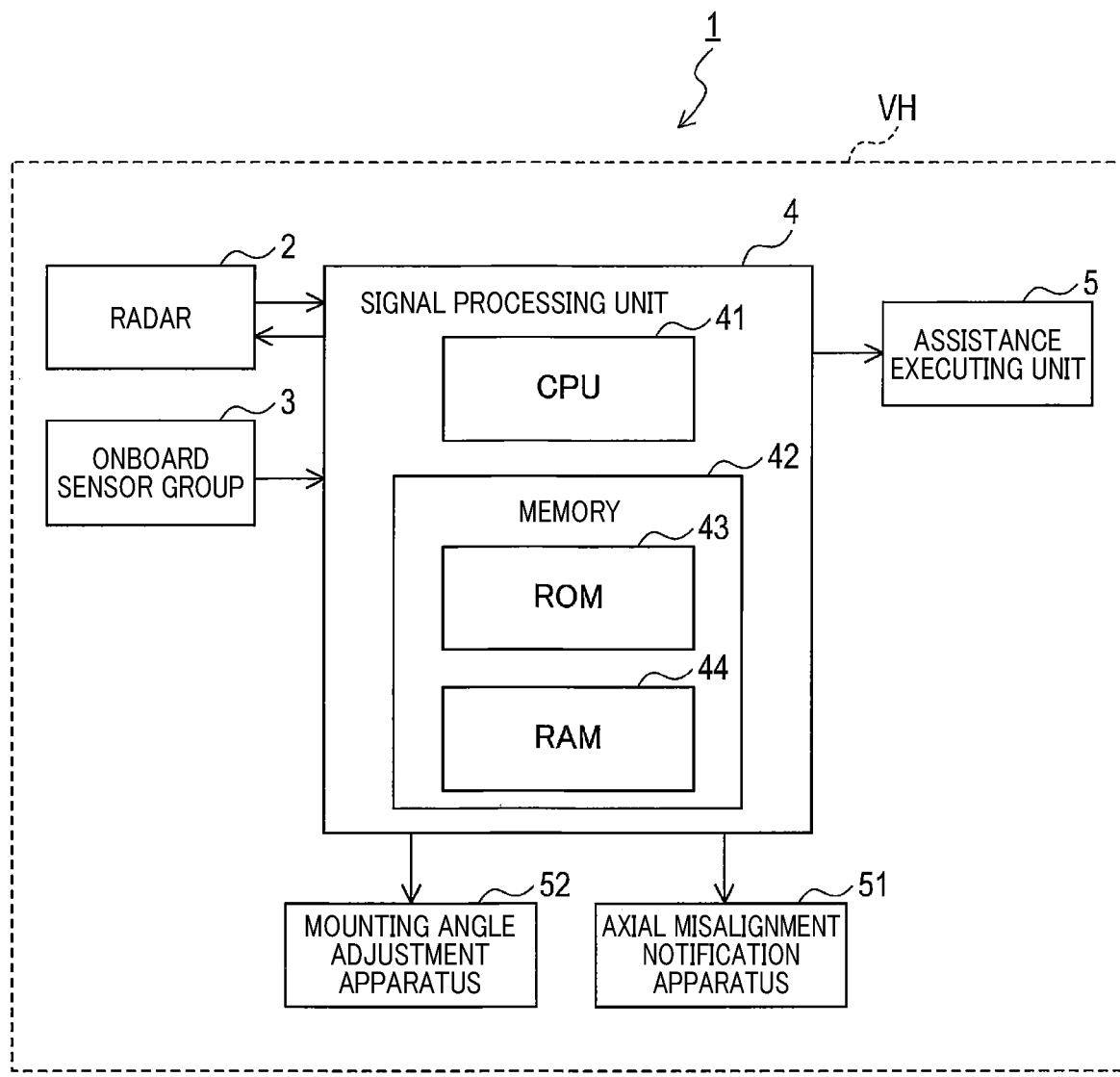
FIG. 1 is a block diagram illustrating a configuration of a vehicle control system.

In an onboard radar apparatus, so-called axial misalignment in which a center axis of a radar beam becomes misaligned as a result of a setup state changing for some reason may occur. For example, Japanese Patent Publication No. 6321448 discloses a technology in which an axial misalignment angle of an onboard radar apparatus is estimated based on a reception strength of a reflected wave from near a vehicle being highest when an axial misalignment occurs.

However, as a result of detailed examination by the inventors, an issue has been found in that, in a conventional apparatus described in Japanese Patent Publication No. 6321448, axial misalignment of the radar apparatus in a height direction cannot be estimated.

It is thus desired to provide a technology for enabling both an axial misalignment angle and axial misalignment in a height direction of a radar apparatus to be estimated.

A first exemplary embodiment of the present disclosure provides an axial misalignment estimation apparatus that is mounted in a moving body. The axial misalignment apparatus includes an acquiring unit, an extracting unit, an apparatus system coordinate unit, and an estimating unit.

The acquiring unit is configured to acquire reflection point information for each of a plurality of reflection points that are detected by a radar apparatus. The reflection point information includes at least a horizontal angle and a vertical angle that are an orientation angle of the reflection point and determined with reference to a beam direction that is a direction along a center axis of a radar beam, and a distance between the radar apparatus and the reflection point.

The extracting unit is configured to extract, from the plurality of reflection points, at least a single road-surface reflection point that is detected by reflection on a road surface, based on at least the reflection point information.

The apparatus system coordinate unit is configured to identify, for each road-surface reflection point, apparatus system coordinates that are three-dimensional coordinates that are based on coordinate axes of the radar apparatus, based on the reflection point information. The estimating unit is configured to estimate an axial misalignment angle and a height of the radar apparatus using a relational expression that is established between at least two unknown parameters and at least two elements. The at least two unknown parameters include the axial misalignment angle and a mounting height of the radar apparatus. The at least two elements are included in the apparatus system coordinates of the road-surface reflection point. The axial misalignment angle is a misalignment angle of a coordinate axis of the radar apparatus around a target axis that is one of a horizontal axis and a moving-direction axis that are coordinate axes of the moving body.

A second exemplary embodiment of the present disclosure provides an axial misalignment estimation apparatus that is mounted in a moving body. The axial misalignment apparatus includes a processor, a non-transitory computer-readable storage medium, and a set of computer-executable instructions stored on the computer-readable storage medium. When read and executed by the processor, the set of computer-executable instructions cause the processor to implement: acquiring, for each of a plurality of reflection points that are detected by a radar apparatus, reflection point information that includes at least a horizontal angle and a vertical angle that are an orientation angle of the reflection point and determined with reference to a beam direction that is a direction along a center axis of a radar beam, and a distance between the radar apparatus and the reflection point; extracting, from the plurality of reflection points, a plurality of road-surface reflection points that are detected by reflection on a road surface based on at least the reflection point information; identifying, for each road-surface reflection point, apparatus system coordinates that are three-dimensional coordinates that are based on coordinate axes of the radar apparatus based on the reflection point information; and estimating an axial misalignment angle and a height of the radar apparatus using a relational expression that is established between at least two unknown parameters and at least two elements. The at least two unknown parameters including the axial misalignment angle that is a misalignment angle of a coordinate axis of the radar apparatus around a target axis that is one of a horizontal axis and a moving-direction axis that are coordinate axes of the moving body, and a mounting height of the radar apparatus. The at least two elements being included in the apparatus system coordinates of the road-surface reflection point.

A third exemplary embodiment of the present disclosure provides an axial misalignment estimation method for a moving body. The axial misalignment estimation method includes: acquiring, for each of a plurality of reflection points that are detected by a radar apparatus, reflection point information that includes at least a horizontal angle and a vertical angle that are an orientation angle of the reflection point and determined with reference to a beam direction that is a direction along a center axis of a radar beam, and a distance between the radar apparatus and the reflection point; extracting, from the plurality of reflection points, a plurality of road-surface reflection points that are detected by reflection on a road surface based on at least the reflection point information; identifying, for each road-surface reflection point, apparatus system coordinates that are three-dimensional coordinates that are based on coordinate axes of the radar apparatus based on the reflection point information; and estimating an axial misalignment angle and a height of the radar apparatus using a relational expression that is established between at least two unknown parameters and at least two elements. The at least two unknown parameters include the axial misalignment angle that is a misalignment angle of a coordinate axis of the radar apparatus around a target axis that is one of a horizontal axis and a moving-direction axis that are coordinate axes of the moving body, and a mounting height of the radar apparatus. The at least two elements are included in the apparatus system coordinates of the road-surface reflection point.

Consequently, the axial misalignment estimation apparatus can simultaneously estimate the axial misalignment angle and the mounting height.

Exemplary embodiments of the present disclosure will hereinafter be described with reference to the drawings. Here, "vertical" as referred to below is not limited to "vertical" in a strict sense and may not be strictly "vertical" as long as similar effects are achieved. This similarly applies to "horizontal" and "coincide," referred to below.

1. First Embodiment 1-1. Configuration
(1) Overall Configuration

A vehicle control system 1 shown in FIG. 1 is a system that is mounted in a vehicle VH that is a moving body. The vehicle control system 1 includes a radar apparatus 2, an onboard sensor group 3, a signal processing unit 4, and an assistance executing unit 5. In addition, the vehicle control system 1 may include an axial misalignment notification apparatus 51 and an adjustment apparatus 52. Hereafter, the vehicle VH in which the vehicle control system 1 is mounted is also referred to as an own vehicle VH. In addition, a vehicle width direction of the own vehicle VH is also referred to as a horizontal direction and a vehicle height direction is also referred to as a vertical direction.

Figure 2:
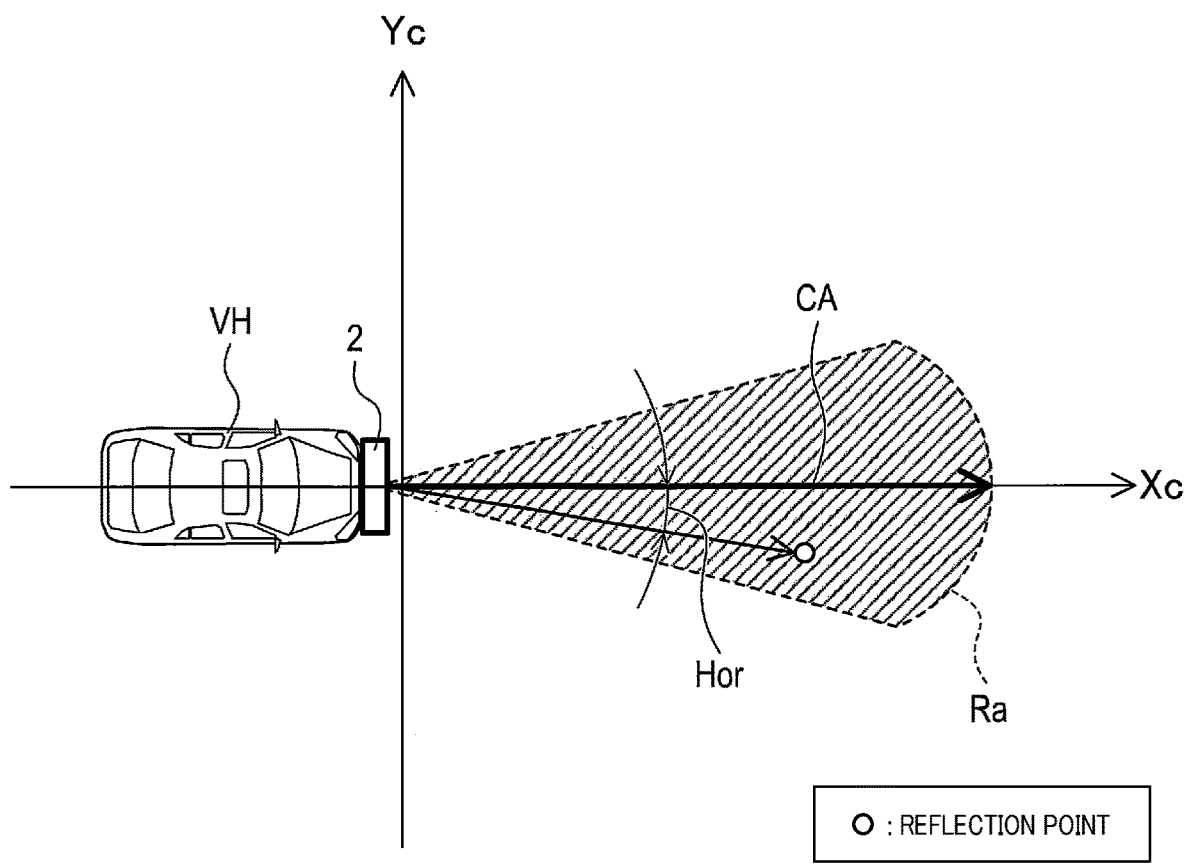
FIG. 2 is an explanatory diagram for explaining an irradiation region of a radar wave in a horizontal direction.
Figure 3:
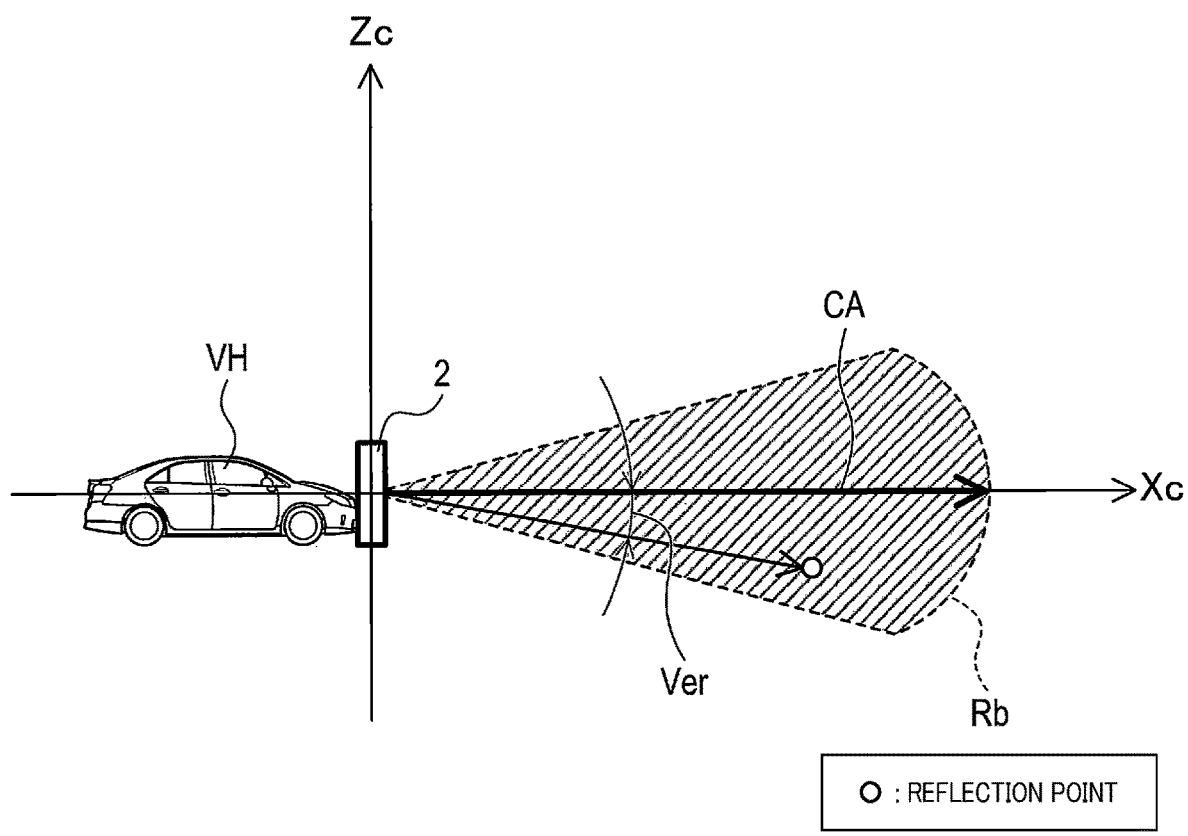
FIG. 3 is an explanatory diagram for explaining an irradiation region of the radar wave in a vertical direction.

As shown in FIG. 2 and FIG. 3, the radar apparatus 2 is mounted on a front side of the own vehicle VH. The radar apparatus 2 irradiates a radar wave within a predetermined angular range Ra in the horizontal direction ahead of the own vehicle VH and within a predetermined angular range Rb in the vertical direction ahead of the own vehicle VH. The radar apparatus 2 receives a reflected wave of the irradiated radar wave and thereby generates reflection point information that is related to a reflection point at which the radar wave is reflected.

Here, the radar apparatus 2 may be a so-called millimeter-wave radar that uses a millimeter-waveband electromagnetic wave as the radar wave. Alternatively, the radar apparatus 2 may be a laser radar that uses laser light as the radar wave or a sonar that uses a sound wave as the radar wave. In any case, an antenna unit that transmits and receives the radar waves is configured to be capable of detecting an arrival direction of the reflected wave in both the horizontal direction and the vertical direction. The antenna unit may include array antennas that are arrayed in the horizontal direction and the vertical direction.

The radar apparatus 2 is attached such that a beam direction coincides with a front/rear direction of the own vehicle VH, that is, a moving direction. The radar apparatus 2 is used to detect various targets that are present ahead of the own vehicle VH. The beam direction is a direction along a center axis CA direction of the irradiated radar beam.

The reflection point information that is generated by the radar apparatus 2 includes at least an orientation angle of the reflection point and a distance of the reflection point. The distance of the reflection point refers to a distance between the radar apparatus 2 and the reflection point. Here, the radar apparatus 2 may be configured to detect a relative speed of the reflection point to the own vehicle VH and a reception strength of the radar beam that is reflected at the reflection point. The reflection point information may include the relative speed and the reception strength in the reflection point.

As shown in FIG. 2 and FIG. 3, the orientation angle of the reflection point is at least either of an angle (hereafter, a horizontal angle) Hor in the horizontal direction and an angle (hereafter, a vertical angle) Ver in the vertical direction at which the reflection point is present, the angles being determined with reference to the beam direction that is the direction along the center axis CA of the radar beam. According to the present embodiment, both the vertical angle Ver and the horizontal angle Hor are included in the reflection point information as information that indicates the orientation angle of the reflection point.

According to the present embodiment, the radar apparatus 2 uses a FMCW system. The radar apparatus 2 alternately transmits a radar wave of an upward modulation section and a radar wave of a downward modulation section at a modulation cycle that is set in advance, and receives the reflected radar waves. FMCW is an abbreviation of Frequency-Modulated Continuous Wave. According to the present embodiment, at each modulation cycle, the radar apparatus 2 detects the horizontal angle Hor and the vertical angle Ver that are the orientation angle of the reflection point as described above, the distance to the reflection point, the relative speed to the reflection point, and reception power of the received radar wave as the reflection point information. Hereafter, the reception power of the received radar wave is referred to as reflection power.

The onboard sensor group 3 is at least a single sensor that is mounted in the own vehicle VH to detect a state of the own vehicle VH and the like. The onboard sensor group 3 may include a vehicle speed sensor. The vehicle speed sensor is a sensor that detects a vehicle speed based on a rotation of a wheel. In addition, the onboard sensor group 3 may include a camera. The camera captures an image of an area that is similar to the irradiation region of the radar wave from the radar apparatus 2.

Furthermore, the onboard sensor group 3 may include an acceleration sensor. The acceleration sensor detects acceleration of the own vehicle VH. In addition, the onboard sensor group 3 may include a yaw rate sensor. The yaw rate sensor detects a rate of change of a yaw angle that indicates an inclination in the moving direction of the own vehicle VH relative to the front of the own vehicle VH.

Furthermore, the onboard sensor group 3 may include a navigation apparatus that includes map information. The navigation apparatus may be that which detects a position of the own vehicle VH based on a global positioning system (GPS) signal or the like, and associates the position of the own vehicle VH and the map information. The map information may include a numeric value that indicates a flatness level of a road surface of a road as various types of information that is related to a road. Each sensor that is included in the onboard sensor group 3 is connected to the signal processing unit 4 by a communication line.

The signal processing unit 4 includes a microcomputer that includes a central processing unit (CPU) 41 and a semiconductor memory (hereafter, a memory 42) such as a read-only memory (ROM) 43, a random access memory (RAM) 44, and a flash memory. Various functions of the signal processing unit 4 are actualized by the CPU 41 running a program that is stored in a non-transitory, tangible recording medium. In this example, the memory 42 corresponds to the non-transitory, tangible recording medium in which the program is stored. In addition, as a result of this program being run, a method corresponding to the program is performed. Here, the signal processing unit 4 may be configured by one or a plurality of microcomputers.

Figure 4:
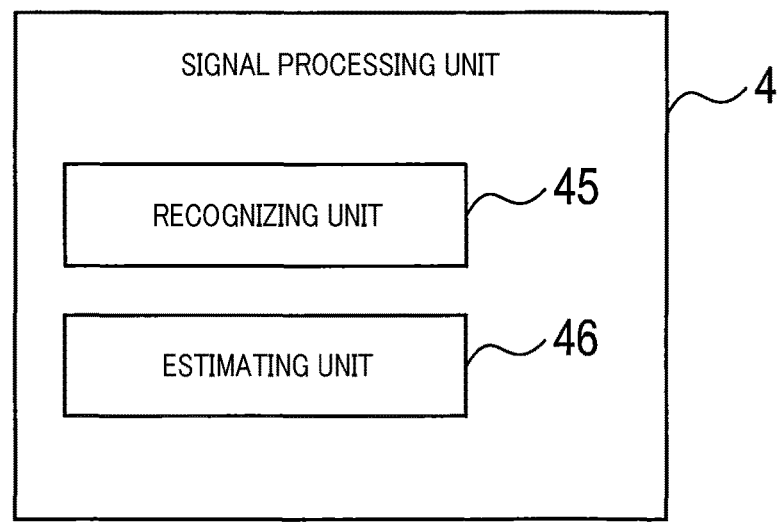
FIG. 4 is a block diagram for explaining functions of a signal processing unit.

As shown in FIG. 4, the signal processing unit 4 provides functions of a recognizing unit 45 and an estimating unit 46. The recognizing unit 45 detects a traffic lane in which the own vehicle VH is traveling, a leading vehicle that is traveling in a same traffic lane as the own vehicle VH, other vehicles, obstacles, and the like based on the reflection point information that is acquired from the radar apparatus 2 and the various types of information that are acquired from the onboard sensor group 3. Detection results of the recognizing unit 45 are outputted to the assistance executing unit 5 and the like. As described hereafter, the estimating unit 46 estimates axial misalignment of the radar apparatus 2.

The assistance executing unit 5 controls various types of onboard equipment and performs predetermined driving assistance based on the detection results of the recognizing unit 45. The various types of onboard equipment to be controlled may include a monitor that displays images and audio equipment that outputs warning sounds and guidance sounds. In addition, the various types of onboard equipment may include control apparatuses that control an internal combustion engine, a power train mechanism, a brake mechanism, and the like of the own vehicle VH.

The axial misalignment notification apparatus 51 is an audio output apparatus that is set inside a vehicle cabin and outputs a warning sound to passengers of the vehicle VH. Here, audio equipment or the like that is provided in the assistance executing unit 5 may be used as the axial misalignment notification apparatus 51.

The adjustment apparatus 52 includes a motor and a gear that is attached to the radar apparatus 2. The adjustment apparatus 52 rotates the motor based on a drive signal that is outputted from the signal processing unit 4. As a result, rotational force of the motor is transmitted to the gear, and the radar apparatus 2 can be rotated on an axis along the horizontal direction and an axis along the vertical direction. In addition, the adjustment apparatus 52 can raise and lower the radar apparatus 2 in the vertical direction.

(2) Axial Misalignment of the Radar Apparatus 2

Axial misalignment of the radar apparatus 2 that is detected by the estimating unit 46 will be described. Axial misalignment refers to a coordinate axis of the radar apparatus 2 when the radar apparatus 2 is actually attached to the vehicle VH being misaligned relative to a coordinate axis of the radar apparatus 2 when the radar apparatus 2 is correctly attached to the own vehicle VH. Axial misalignment of the radar apparatus 2 includes axial misalignment around an apparatus coordinate axis and axial misalignment in a height direction.

(a) Coordinate Axes

The coordinate axes of the radar apparatus 2 and the coordinate axes of the own vehicle VH will be described.

Figure 5:
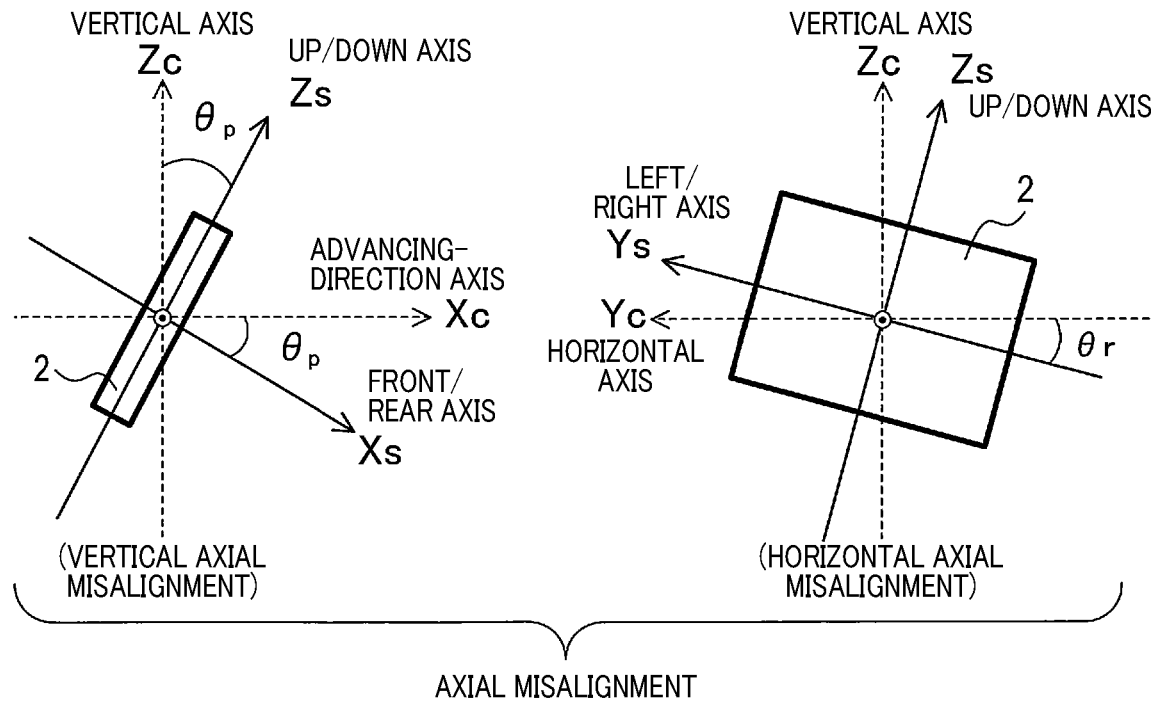
FIG. 5 is an explanatory diagram for explaining a vertical axial misalignment angle and a roll angle.

Here, as shown in FIG. 5, in a state in which the radar apparatus 2 is attached to the own vehicle VH, the coordinate axes of the radar apparatus 2 refer to an up/down axis Zs that extends above and below the radar apparatus 2, a left/right axis Ys that extends to left and right of the radar apparatus 2, and a front/rear axis Xs that extends to front and rear of the radar apparatus 2. The up/down axis Zs, the left/right axis Ys, and the front/rear axis Xs are orthogonal to one another. According to the present embodiment in which the radar apparatus 2 is set in a front side of the own vehicle VH, the front/rear axis Xs is equivalent to the center axis CA.

Meanwhile, the coordinate axes of the own vehicle VH refer to a vertical axis Zc that is an axis that extends in the vertical direction, a horizontal axis Yc that is an axis that extends in the horizontal direction, and a moving-direction axis Xs that extends in the moving direction of the own vehicle VH. The vertical axis Zc, the horizontal axis Yc, and the moving-direction axis Xc are orthogonal to one another.

Here, according to the present embodiment, as described above, when the radar apparatus 2 is accurately attached to the own vehicle VH, the center axis CA coincides with the moving direction of the own vehicle VH. That is, respective directions of the coordinate axes of the radar apparatus 2 and the coordinate axes of the own vehicle VH coincide. For example, in an initial state such as during shipping from a factory, the radar apparatus 2 may be accurately attached to the own vehicle VH, that is, in a position that is prescribed in advance. In the recognizing unit 45, a target recognition function can be accurately actualized based on the detection result of the radar apparatus 2 that is accurately attached to the own vehicle VH.

(b) Axial Misalignment Around an Apparatus Coordinate Axis

Subsequent to the initial state, axial misalignment around an apparatus coordinate axis may occur in the own vehicle VH. Such axial misalignment includes vertical axial misalignment and roll axial misalignment. An axial misalignment angle expresses a magnitude of such axial misalignment by degrees.

Here, vertical axial misalignment refers to a state in which misalignment occurs between the up/down axis Zs that is a coordinate axis of the radar apparatus 2 and the vertical axis Zc that is a coordinate axis of the own vehicle VH. The axial misalignment angle during such vertical axial misalignment is referred to as a vertical axial misalignment angle θp. The vertical axial misalignment angle θp is a so-called pitch angle θp and is an axial misalignment angle of the coordinate axis (that is, the left/right axis Ys) of the radar apparatus 2 around the horizontal axis Yc of the own vehicle VH. That is, the vertical axial misalignment angle θp is an axial misalignment angle when axial misalignment around the left/right axis Ys of the radar apparatus 2 occurs. Here, as is clear from FIG. 5, the vertical axial misalignment angle θp may also be an angle that indicates a magnitude of misalignment between the front/rear axis Xs that is a coordinate axis of the radar apparats 2 and the moving-direction axis Xc that is a coordinate axis of the own vehicle VH.

Meanwhile, roll axial misalignment refers to a state in which misalignment occurs between the left/right axis Ys that is a coordinate axis of the radar apparatus 2 and the horizontal axis Yc that is a coordinate axis of the own vehicle VH. The axial misalignment angle during such roll axial misalignment is referred to as a roll angle θr. That is, the roll angle θr is an axial misalignment angle of a coordinate axis (that is, the front/rear axis Xs) of the radar apparatus 2 around the moving-direction axis Xc of the own vehicle VH. That is, the roll angle θr is an axial misalignment angle when axial misalignment around the front/rear axis Xs of the radar apparatus 2 occurs.

Figure 6:
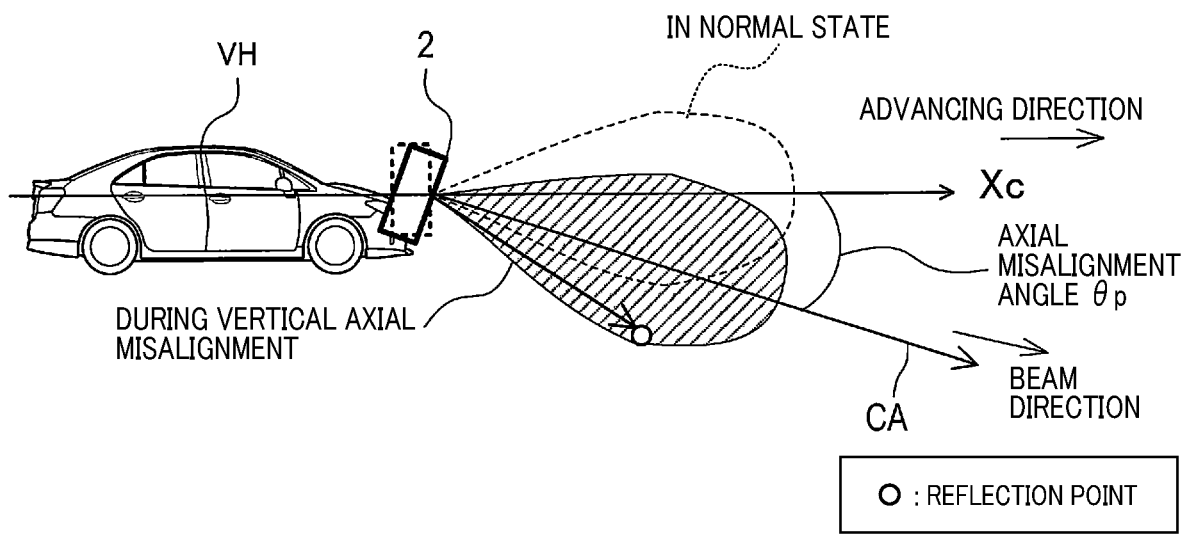
FIG. 6 is an explanatory diagram for explaining an example of vertical axial misalignment.

For example, FIG. 6 shows a state in which the vertical axial misalignment, that is, axial misalignment around the left/right axis Ys of the radar apparatus has occurred.

(c) Axial Misalignment in the Height Direction

As described above, in the initial state, the radar apparatus 2 is accurately attached to the own vehicle VH in a position that is prescribed in advance. An initial height referred to below refers to a height of the radar apparatus 2 from a road surface. For example, the initial height may be stored in the memory 42 that is the ROM 43 in advance.

Figure 7:
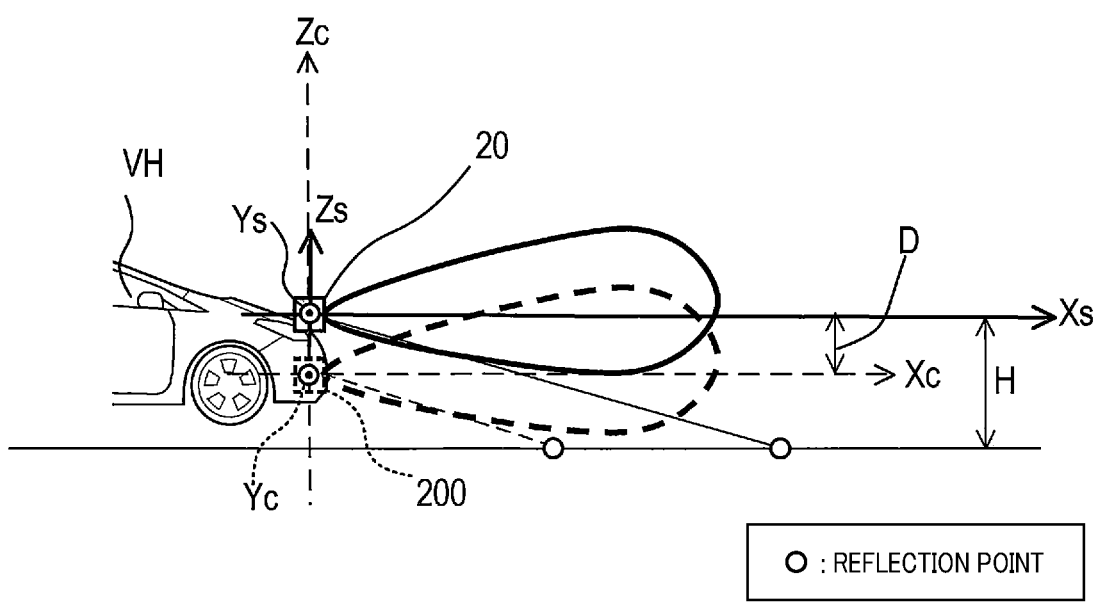
FIG. 7 is an explanatory diagram for explaining positional misalignment of the radar apparatus in a height direction.

Subsequent to the initial state, in the own vehicle VH, axial misalignment in the height direction (hereafter, height misalignment) may occur in the radar apparatus 2. An example of height misalignment is shown in FIG. 7. A radar apparatus 200 that is shown by a dotted line indicates a position when the radar apparatus 200 is set at an initial height F. For example, height misalignment may occur when a user replaces tires of the own vehicle VH with tires that have a tire diameter that differs from that when the initial height is stored, when the user replaces a suspension of the own vehicle VH with a suspension that differs from that when the initial height is stored, and the like.

Height misalignment refers to a state in which misalignment from the initial height that is a height that is prescribed in advance occurs in a mounting height H in the vertical direction. The mounting height H refers to the height of the radar apparatus 2 that is mounted in the own vehicle VH from the road surface. A height misalignment amount D expresses a magnitude of such height misalignment by distance.

According to the present embodiment in which the radar apparatus 2 is set in the front side of the own vehicle VH, the front/rear axis Xs is equivalent to the center axis CA. That is, the height misalignment amount D corresponds to a distance in the vertical direction between the moving-direction axis Xc and the front/rear axis Xs of the radar apparatus 2.

The estimating unit 46 performs an axial misalignment estimation process described hereafter and estimates the axial misalignment of the radar apparatus 2 such as that described above.

1-2. Processes (1-1) Axial Misalignment Estimation Process

Figure 8:
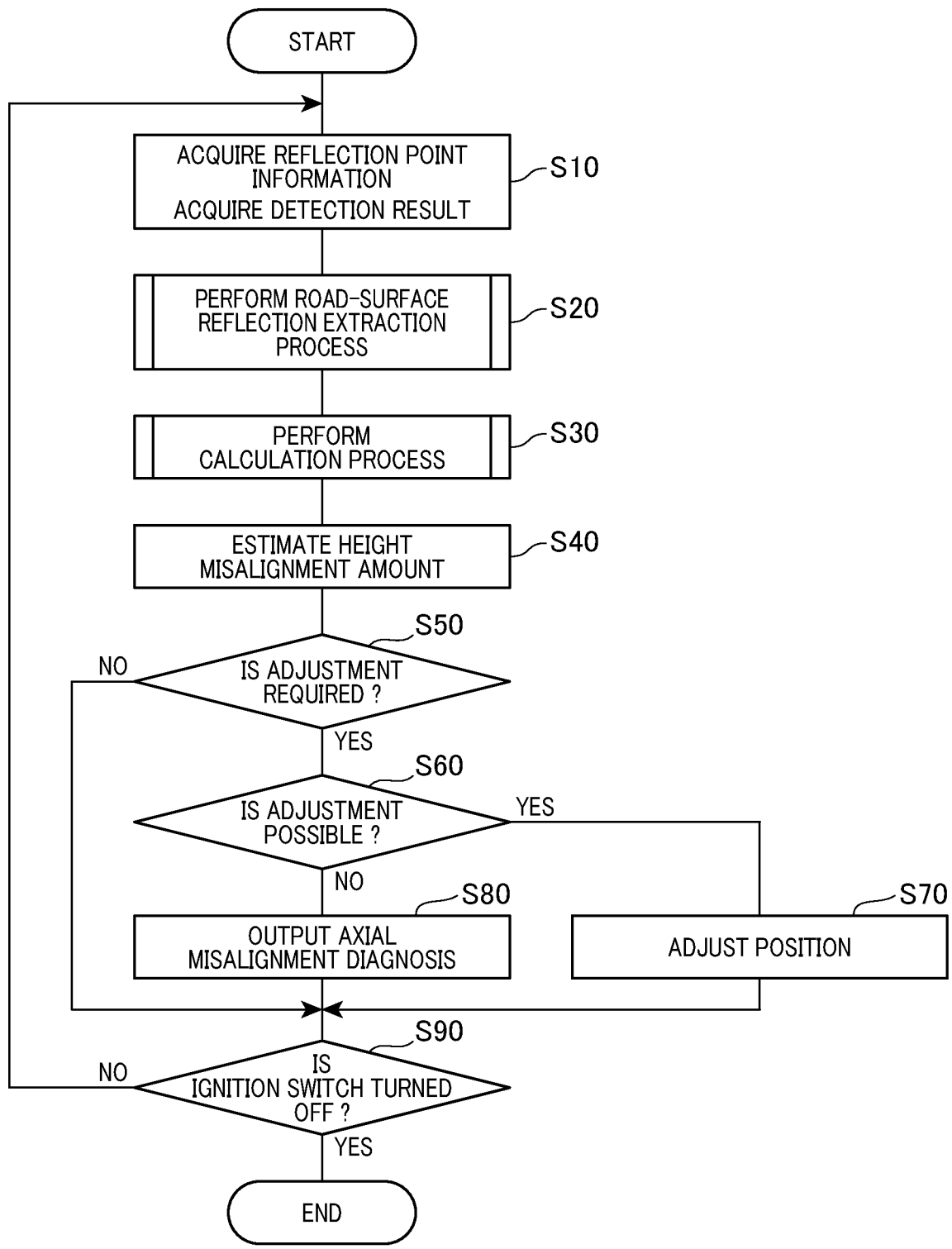
FIG. 8 is a flowchart illustrating an axial misalignment estimation process according to a first embodiment.

Next, the axial misalignment estimation process performed by the signal processing unit 4 will be described with reference to a flowchart in FIG. 8. The present process is started when an ignition switch is turned on. Here, an example in which the signal processing unit 4 estimates the vertical axial misalignment angle (that is, the pitch angle) θp that serves as the axial misalignment angle and the mounting height H of the radar apparatus 2 by the axial misalignment estimation process will be described below.

When the present process is started, at S10, the signal processing unit 4 acquires the reflection point information from the radar apparatus 2. As described above, the reflection point information is information on each of a plurality of reflection points that are detected by the radar apparatus 2 that is mounted in the own vehicle VH. The reflection point information includes at least the horizontal angle and the vertical angle that serve as the orientation angle of the reflection point, and the distance between the radar apparatus 2 and the reflection point. Hereafter, the reflection point that is identified from the reflection point information is referred to as an acquired reflection point. In addition, the signal processing unit 4 acquires various detection results including an own vehicle speed Cm and the like from the onboard sensor group 3.

At S20, the signal processing unit 4 performs a road-surface reflection extraction process. The road-surface reflection extraction process is a process for extracting a road-surface reflection point that is a reflection point on a road surface, from the acquired reflection points. The road-surface reflection point refers to a reflection point that is detected by reflection on the road surface. Details of the road-surface reflection extraction process will be described hereafter.

At S30, the signal processing unit 4 performs a calculation process. The calculation process is a process for estimating the axial misalignment angle of the radar apparatus 2 and the mounting height H of the radar apparatus 2 based on at least a position of the road-surface reflection point. According to the present embodiment, the signal processing unit 4 estimates the vertical axial misalignment angle θp that serves as the axial misalignment angle of the radar apparatus 2 and the mounting height H of the radar apparatus 2. Details of the calculation process will be described hereafter.

At S40, the signal processing unit 4 identifies the height misalignment amount D. According to the present embodiment, the height misalignment amount D refers to a difference between the mounting height H estimated at S30 and the initial height. The estimating unit 46 stores the identified height misalignment amount D in the memory 42.

At S50, the signal processing unit 4 determines whether the axial misalignment angle estimated at S30 and the height misalignment amount D estimated at S40 require adjustment by the mounting height adjustment apparatus 52. When at least either of the vertical axial misalignment angle θp being equal to or greater than a threshold angle that is an angle that is prescribed in advance, and the height misalignment amount D being equal to or greater than a threshold distance that is a distance that is prescribed in advance is satisfied, the signal processing unit 4 determines that adjustment is required. Here, when determined that adjustment is not required, that is, when the vertical axial misalignment angle θp is less than the threshold angle and the height misalignment amount D is less than the threshold distance, the signal processing unit 4 shifts the process to S90. Meanwhile, when determined that adjustment is required, the signal processing unit 4 shifts the process to S60.

At S60, the signal processing unit 4 determines whether both of the axial misalignment angle estimated at S30 and the height misalignment amount D estimated at S40 are within an adjustable range of the adjustment apparatus 52. Here, when both of the vertical axial misalignment angle θp and the height misalignment amount D are within the adjustable range, the signal processing unit 4 shifts the process to S70. Meanwhile, when at least either of the vertical axial misalignment angle θp and the height misalignment amount D is outside the adjustable range, the signal processing unit 4 shifts the process to S80.

At S70, the signal processing unit 4 adjusts, by the adjustment apparatus 52, the radar mounting angle by an amount amounting to the axial misalignment angle estimated at S30. That is, the signal processing unit 4 rotates the radar apparatus 2 by an amount amounting to the vertical axial misalignment angle θp around the left/right axis Ys of the radar apparatus 2, with the left/right axis Ys as the center. In addition, the signal processing unit 4 adjusts, by the adjustment apparatus 52, the mounting height H by an amount amounting to the height misalignment amount D estimated at S40. That is, the signal processing unit 4 adjusts the mounting height H by raising or lowering the radar apparatus 2 by an amount amounting to the height misalignment amount D in the vehicle height direction, with the front/rear axis Xs of the radar apparatus 2 as the center. Then, the signal processing unit 4 ends the axial misalignment estimation process.

Here, the signal processing unit 4 may calculate the orientation angle of the reflection point acquired at S10 and an orientation angle that is corrected by an amount amounting to the axial misalignment angle estimated at S30 in a process separate from the present axial misalignment estimation process. Then, the signal processing unit 4 may perform the recognizing unit 45 based on the orientation angle after correction.

At S80, the signal processing unit 4 outputs diagnosis information that indicates axial misalignment has occurred in the radar apparatus 2 to an external apparatus of the signal processing unit 4. Hereafter, the diagnosis information that indicates axial misalignment has occurred in the radar apparatus 2 is referred to as an axial misalignment diagnosis. The external apparatus may be the axial misalignment notification apparatus 51. For example, the signal processing unit 4 may output the axial misalignment diagnosis to the axial misalignment notification apparatus 51. The axial misalignment notification apparatus 51 may output a warning sound based on the axial misalignment diagnosis.

At S90, the signal processing unit 4 determines whether the ignition switch is turned off. Here, when the ignition switch is not turned off, the signal processing unit 4 shifts the process to S10. Meanwhile, when the ignition switch is turned off, the signal processing unit 4 thereby ends the present axial misalignment estimation process.

(2-2) Road-Surface Reflection Extraction Process

Next, the road-surface reflection extraction process performed by the signal processing unit 4 at S20 in the axial misalignment estimation process will be described with reference to a flowchart in FIG. 9.

At S100, the signal processing unit 4 acquires the detection results of the various sensors regarding the state of the own vehicle VH and the like from the onboard sensor group 3. The detection results herein may include the vehicle speed, the acceleration, the yaw angle, and the like of the own vehicle VH.

At S110, the signal processing unit 4 determines whether a road-surface reflection point is extracted based on the detection results regarding the state of the own vehicle VH and the like that are acquired from the onboard sensor group 3.

Specifically, the signal processing unit 4 determines whether a vehicle body of the own vehicle VH is stable relative to the road surface based on the detection results regarding the state of the own vehicle VH and the like. When the vehicle body of the own vehicle VH is stable relative to the road surface, the signal processing unit 4 determines that a road-surface reflection point is extracted.

The state in which the vehicle body of the own vehicle VH is stable relative to the road surface may be a state in which the vehicle body of the own vehicle VH is not inclined relative to the road surface or a state in which the vehicle body of the own vehicle VH is not moving up and down relative to the road surface. In other words, the state in which the vehicle body of the own vehicle VH is stable relative to the road surface may be a state in which a curved road that has a large curvature is not being traveled or a state in which a road surface that has significant unevenness is not being traveled.

Here, a case in which a road surface that has significant unevenness is not being traveled can be considered to be a case in which a flat road surface is being traveled. In this case, the speed and the acceleration are considered to be greater than those when the road surface that has significant unevenness is being traveled. Meanwhile, a case in which a curved road that has a large curvature is not being traveled can be considered to be a case that is close to a state in which a straight road is being traveled. In this case, the speed and the acceleration are often greater than those when the curved road that has a large curvature is being traveled, and the rate of change of the yaw angle is often smaller than when the curved road that has a large curvature is traveled.

Therefore, when the vehicle speed of the own vehicle VH is equal to or greater than a vehicle-speed threshold that is prescribed in advance, the signal processing unit 4 may determine that the vehicle body of the own vehicle VH is stable relative to the road surface and may determine that the road-surface reflection point is extracted. That is, when the vehicle speed of the own vehicle VH is less than the vehicle-speed threshold, the signal processing unit 4 may determine that the vehicle body of the own vehicle VH is not stable relative to the road surface and may determine that the road-surface reflection point is not extracted.

In a similar manner, when the acceleration of the own vehicle VH is equal to or greater than an acceleration threshold that is prescribed in advance, the signal processing unit 4 may determine that the vehicle body of the own vehicle VH is stable relative to the road surface and may determine that the road-surface reflection point is extracted. In addition, in a similar manner, when the rate of change of the yaw angle of the own vehicle VH is less than a threshold that is prescribed in advance, the signal processing unit 4 may determine that the vehicle body of the own vehicle VH is stable relative to the road surface and may determine that the road-surface reflection point is extracted.

When determined that the road-surface reflection point is extracted, the signal processing unit 4 shifts the process to S120. When determined that the road-surface reflection point is not extracted, the signal processing unit 4 shifts the process to S180.

At S120, the signal processing unit 4 selects a single acquired reflection point from all acquired reflection points. The signal processing unit 4 performs processes at S130 to S195 on the selected acquired reflection point (referred to, hereafter, as simply an acquired reflection point).

At S130, the signal processing unit 4 determines whether the acquired reflection point is positioned within an extraction range that is a predetermined orientation range that includes the center axis CA in the horizontal direction. When the acquired reflection point is positioned within the orientation range, the signal processing unit 4 shifts the process to S140. When the selected acquired reflection point is not positioned within the orientation range, the signal processing unit 4 shifts the process to S190.

That is, the signal processing unit 4 extracts the acquired reflection point that is positioned within the extraction range from the plurality of acquired reflection points. For example, the extraction range may be prescribed to be a range that is ±several degrees to several tens of degrees that includes the center axis CA in the horizontal direction. In other words, the extraction range may be prescribed to be a predetermined range near the moving direction of the own vehicle VH according to the present embodiment in which the radar apparatus 2 is set on the front side of the own vehicle VH.

The extraction range may be prescribed in advance based on an experiment or the like. The extraction range is stored in the memory 42 in advance.

At S140, the signal processing unit 4 determines whether a distance from the radar apparatus 2 of the selected acquired reflection point is less than a predetermined distance threshold. When the distance of the selected acquired reflection point is less than the distance threshold, the signal processing unit 4 shifts the process to S150. When the distance of the selected acquired reflection point is equal to or greater than the distance threshold, the signal processing unit 4 shifts the process to S190.

That is, the signal processing unit 4 extracts the acquired reflection point of which the distance from the radar apparatus 2 is less than the distance threshold. The distance threshold is stored in the memory 42 in advance.

At S150, the signal processing unit 4 determines whether the acquired reflection point is a stationary reflection point. When the acquired reflection point is a stationary reflection point, the signal processing unit 4 shifts the process to S160. When the acquired reflection point is not a stationary reflection point, the signal processing unit 4 shifts the process to S190. The stationary reflection point is a reflection point at which the radar wave is reflected by a stationary object.

That is, the signal processing unit 4 extracts a stationary reflection point from the acquired reflection points. Specifically, using the own vehicle speed Cm acquired at S10, with the relative speed that is included in the reflection point information as q, a lower-limit speed threshold that is set in advance as $\varepsilon_1$, and an upper-limit speed threshold as $\varepsilon_2$, the signal processing unit 4 may extract an acquired reflection point that satisfies $\varepsilon_1 \leq q/Cm < \varepsilon_2$ as the stationary reflection point. That is, an acquired reflection point of which a ratio of the own vehicle speed Cm to the relative speed q is within a speed threshold range prescribed in advance that is equal to or greater than $\varepsilon_1$ and less than $\varepsilon_2$ may be extracted as the stationary reflection point.

When a direction from the stationary reflection point to the radar apparatus 2 and the beam direction coincide, the own vehicle speed Cm and the relative speed q of the reflection point are of a same magnitude, and a direction of the relative speed q is opposite that of the own vehicle speed Cm. Therefore, $q/Cm = -1$. In this manner, the reflection point of which $q/Cm = -1$ can be considered to be the stationary reflection point.

However, the own vehicle speed Cm that is acquired from the onboard sensor group 3 does not necessarily coincide with an actual vehicle speed as a result of slipping of wheels and the like. In addition, the relative speed q that is detected by the radar apparatus 2 also includes error. Therefore, even when the reflection point is the stationary reflection point, in some cases, $q/Cm = -1$ is not necessarily satisfied. As the lower-limit speed threshold $\varepsilon_1$ and the upper-limit speed threshold $\varepsilon_2$, values that are set as appropriate taking into consideration effects of the foregoing may be used.

At S160, the signal processing unit 4 determines whether the reflection power of the acquired reflection point is less than a power threshold that is prescribed in advance. When the reflection power of the acquired reflection point is less than the power threshold, the signal processing unit 4 shifts the process to S170. When the reflection power of the acquired reflection point is equal to or greater than the power threshold, the signal processing unit 4 shifts the process to S190.

That is, the signal processing unit 4 extracts the acquired reflection point of which the reflection power is less than the power threshold. The reflection power from the road surface is considered to be less than, for example, the reflection power from another vehicle. The power threshold may be prescribed as appropriate based on such reflection power from the road surface. For example, the power threshold may be prescribed in advance based on an experiment or the like. The power threshold is stored in the memory 42 in advance.

At S170, the signal processing unit 4 determines whether the acquired reflection point is identified as being a road surface in a captured image by the camera. When the acquired reflection point is estimated to be the road surface in the captured image, the signal processing unit 4 shifts the process to S180. When the acquired reflection point is not estimated to be the road surface in the captured image, the signal processing unit 4 shifts the process to S195.

That is, the signal processing unit 4 extracts an acquired reflection point that is identified as being the road surface in the captured image. Here, the signal processing unit 4 may be configured to acquire the captured image by the camera and estimate an orientation range that is identified as being the road surface in the captured image in a process separate from the present axial misalignment estimation process.

At S180, the signal processing unit 4 determines that the acquired reflection point is the road-surface reflection point. The signal processing unit 4 stores three-dimensional coordinates of the acquired reflection point as the road-surface reflection point in the memory 42 and shifts the process to S195.

At S190, the signal processing unit 4 determines that the acquired reflection point is not a road-surface reflection point and shifts the process to S195 without storing the acquired reflection point in the memory 42.

At S195, the signal processing unit 4 determines whether confirmation regarding whether the acquired reflection point is a road-surface reflection point is completed for all acquired reflection points. Here, when the confirmation is not completed, the signal processing unit 4 shifts the process to S110 and repeats the processes at S110 to S195. Meanwhile, when the confirmation is completed, the signal processing unit 4 ends the present road-surface reflection extraction process.

That is, in the road-surface extraction process according to the present embodiment, of the acquired reflection points, the acquired reflection point that satisfies all of (a) to (e) that follow is extracted as the road-surface reflection point.

(a) The acquired reflection point is positioned within the extraction range that includes the center axis CA in the horizontal direction.
(b) The distance from the radar apparatus 2 is less than the distance threshold.
(c) The acquired reflection point is a stationary reflection point.
(d) The reflection power is less than the power threshold.
(e) The acquired reflection point is identified as being the road surface in the captured image by the camera.

Here, the road-surface reflection extraction process may be configured to satisfy at least (a) of (a) to (e) above. That is, the road-surface reflection extraction process may be configured such that (a) is satisfied and at least one of (b) to (e) is further satisfied. Alternatively, the road-surface reflection extraction process may be configured such that at least (a) and (b) are satisfied. That is, the road-surface reflection extraction process satisfies (a) and (b), and the road-surface reflection extraction process may be configured to further satisfy at least one of (c) to (e).

2-3. Calculation Process

Next, the calculation process that is performed by the signal processing unit 4 at S30 in the axial misalignment estimation process will be described with reference to a flowchart in FIG. 10. The signal processing unit 4 estimates the vertical axial misalignment angle θp and the mounting height H by the calculation process.

At S210, the signal processing unit 4 calculates apparatus system coordinates of the road-surface reflection point based on the reflection point information, using the distance and the orientation angle that are included in the reflection point information. The apparatus system coordinates are three-dimensional coordinates that are based on the coordinate axes of the radar apparatus 2. The apparatus system coordinates are coordinates of which elements are a horizontal distance (hereafter, $y_s$), a vertical distance (hereafter, $z_s$), and a beam-direction distance (hereafter, $x_s$) on a plane that is orthogonal to the beam direction. The signal processing unit 4 calculates the apparatus system coordinates ($x_s$, $y_s$, $z_s$) for all road-surface reflection points and stores the apparatus system coordinates in the memory 42.

At S220, the signal processing unit 4 estimates the vertical axial misalignment angle θp and the mounting height H of the radar apparatus 2. Specifically, the signal processing unit 4 performs the estimation using a relational expression (that is, expression (1)) that is established between the vertical axial misalignment angle θp that is an unknown parameter, the mounting height H that is an unknown parameter and two elements (that is, $x_s$ and $z_s$) that are included in the apparatus system coordinates.

$$\begin{bmatrix} \tan\theta_p \\ \dfrac{H}{\cos\theta_p} \end{bmatrix} = (A^T A)^{-1} A^T B \tag{1}$$

Where $$\left. \begin{aligned} A &= [\, x_s \quad 1 \,] \\ B &= [-z_s] \end{aligned} \right\} \tag{2}$$

Here $$\left. \begin{aligned} x_s &= [\, x_{s1}, \ x_{s2}, \ \cdots \ x_{sn} \,]^T \\ y_s &= [\, y_{s1}, \ y_{s2}, \ \cdots \ y_{sn} \,]^T \\ z_s &= [\, z_{s1}, \ z_{s2}, \ \cdots \ z_{sn} \,]^T \end{aligned} \right\} \tag{3}$$

A and B in expression (1) are as shown in expression (2). In addition, when a plurality (that is, an n number) is detected, the apparatus system coordinates of each road-surface reflection point are expressed as ($x_{sn}$, $y_{sn}$, $z_{sn}$), where n is an integer of 2 or more. $x_s$, $y_s$, and $z_s$ of each road-surface reflection point is expressed as in expression (3). That is, A is an n×2 matrix and B is an n×1 matrix.

The signal processing unit 4 calculates the vertical axial misalignment angle θp and the mounting height H based on expression (1). The signal processing unit 4 stores the calculated vertical axial misalignment angle θp and the mounting height H in the memory 42, and ends the present calculation process.

2-4. Derivation of the Relational Expression

Derivation of the relational expression (that is, expression (1) according to the present embodiment) will be described.

Here, first, correspondence between the axial misalignment angle and the two elements that are included in the apparatus system coordinates in the relational expression will be described.

When one of the horizontal axis Yc and the moving-direction axis Xc that are coordinate axes of the own vehicle VH is a target axis, the axial misalignment angle can be considered to be a misalignment coordinate axis of the radar apparatus 2 around the target axis. For example, the vertical axial misalignment angle θp may be an axial misalignment angle of the coordinate axis of the radar apparatus 2 around the horizontal axis Yc that serves as the target axis. The roll angle θr may be an axial misalignment angle of the coordinate axis of the radar apparatus 2 around the moving-direction axis Xc that serves as the target axis.

When the coordinate axis of the radar apparatus 2 that corresponds to the target axis is a corresponding axis, the corresponding axis that corresponds to the horizontal axis Yc is the left/right axis Ys. The corresponding axis that corresponds to the moving-direction axis Xc is the front/rear axis Xs.

The two elements that are included in the apparatus system coordinates described above are the elements that are related to the two coordinate axes of the radar apparatus 2 that are included on a plane that is perpendicular to the corresponding axis among the three coordinate axes of the radar apparatus 2. In other words, the two elements that are included in the apparatus system coordinates described above correspond to coordinates of a projection point that is the road-surface reflection point projected onto a projection plane that is the plane that is perpendicular to the corresponding axis among the three coordinate axes of the radar apparatus 2.

According to the present embodiment in which the vertical axial misalignment angle θp is estimated, the target axis is the horizontal axis Yc and the corresponding axis is the left/right axis Ys. As a result, elements (that is, $z_s$ and $x_s$) that are related to the up/down axis Zs and the front/rear axis Xs of the radar apparatus 2 that are included on a plane that is perpendicular to the left/right axis Ys that is the corresponding axis correspond to the two elements that are included in the apparatus system coordinates described above. In other words, the two elements $z_s$ and $x_s$ that are included in the apparatus system coordinates correspond to the coordinates of the projection point that is the road-surface reflection point projected onto the projection plane that is perpendicular to the left/right axis Ys.

Here, in an example in which the roll angle θr is estimated (that is, a first modification described hereafter), the target axis is the moving-direction axis Xc and the corresponding axis is the front/rear axis Xs. As a result, elements (that is, $y_s$ and $z_s$) that are related to the left/right axis Ys and the up/down axis Zs of the radar apparatus 2 that are included on a plane that is perpendicular to the front/rear axis Xs that is the target axis correspond to the two elements that are included in the apparatus system coordinates described above. In other words, the two elements $y_s$ and $z_s$ that are included in the apparatus system coordinates correspond to the coordinates of the projection point that is the road-surface reflection point projected onto the projection plane that is perpendicular to the front/rear axis Xs.

In this manner, the two elements of the relational expression are identified.

Next, derivation of the relational expression will be described. Hereafter, derivation of the relational expression (that is, expression (1)) for estimating the vertical axial misalignment angle θp will be described.

Figure 11:
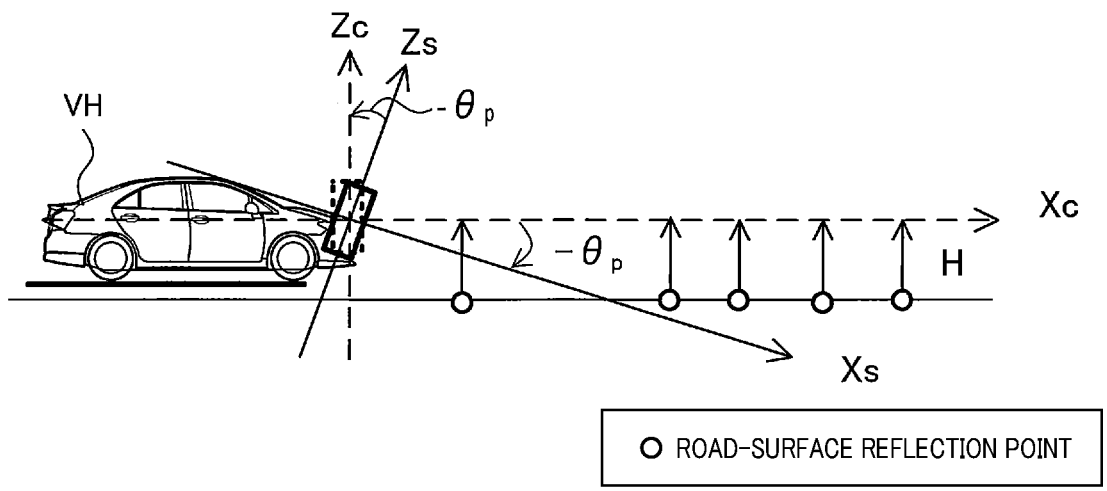
FIG. 11 is an explanatory diagram for explaining principles for estimating the vertical axial misalignment angle according to the first embodiment.

As shown in FIG. 11, the road-surface reflection point is positioned on the road surface. That is, the road-surface reflection points are positioned on a same plane that is the road surface. Therefore, the plurality of road-surface reflection points are thought to be linearly arrayed on the above-described projection plane.

Here, under an assumption that height misalignment has not occurred in the radar apparatus 2, on the projection plane, the front/rear axis Xs and the up/down axis Zs that are the coordinate axes of the radar apparatus 2 coincide with the moving-direction axis Xc and the vertical axis Zc that are the coordinate axes of the own vehicle VH by being rotated by an amount amounting to the vertical axial misalignment angle θp.

That is, on the projection plane, the two elements ($x_s$, $z_s$) of the apparatus system coordinates coincide with two elements ($x_c$, $z_c$) of vehicle system coordinates by the coordinate axes of the radar apparatus 2 being shifted by an amount amounting to the vertical axial misalignment angle θp around the moving-direction axis Xc. Here, the vehicle system coordinates are three-dimensional coordinates ($x_c$, $y_c$, $z_c$) that are based on the coordinate axes of the own vehicle VH.

In other words, on the projection plane, the two elements ($x_s$, $z_s$) of the apparatus system coordinates coincide with the two elements ($x_c$, $z_c$) of the vehicle system coordinates by the radar apparatus 2 being rotated by an amount amounting to the vertical axial misalignment angle θp around the front/rear axis Xs. That is, expression (4) shown below is established.

$$\begin{bmatrix} X_C \\ Z_C \end{bmatrix} = \begin{bmatrix} \cos\theta_p & -\sin\theta_p \\ \sin\theta_p & \cos\theta_p \end{bmatrix} \begin{bmatrix} X_S \\ Z_S \end{bmatrix} \quad (4)$$

Figure 9:
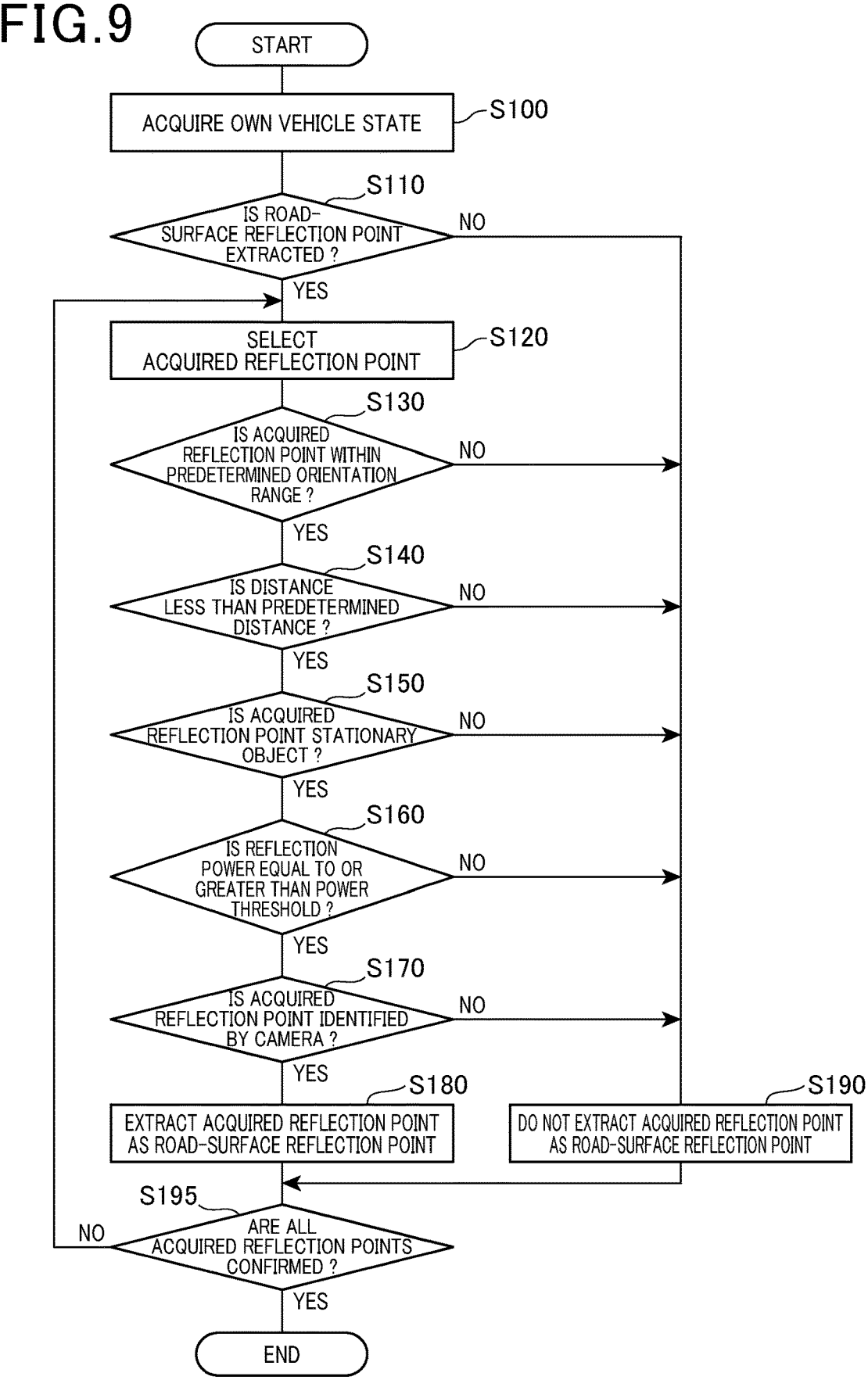
FIG. 9 is a flowchart illustrating a road-surface reflection extraction process.

Meanwhile, from FIG. 9, it is clear that a magnitude of ($z_c$) of the vehicle system coordinates is equal to the mounting height H and a sign is negative. From this, expression (5) is obtained.

$$[z_c] = [-H] \quad (5)$$

Then, a relationship in expression (6) is obtained from expression (4) and expression (5).

$$[z_c] = [\sin\theta_p \times x_s + \cos\theta_p \times z_s] = [-H] \quad (6)$$

Furthermore, a relationship in expression (7) is obtained from expression (6), and expression (8) and expression (9) are obtained from expression (7).

$$[\sin\theta_p \times x_s + H] = [-\cos\theta_p \times z_s] \quad (7)$$

$$\left[\frac{\sin\theta_p}{\cos\theta_p} \times x_s + \frac{H}{\cos\theta_p}\right] = [-z_s] \quad (8)$$

$$[x_s \ 1] \begin{bmatrix} \tan\theta_p \\ \dfrac{H}{\cos\theta_p} \end{bmatrix} = [-z_s] \quad (9)$$

In expression (9), A and B can be expressed as in expression (2) and expression (1) can be obtained.

1-3. Effects

According to the first embodiment described in detail above, following effects are achieved.

(1a) At S10, the signal processing unit 4 repeatedly acquires the reflection point information for each of the plurality of reflection points that are detected by the radar apparatus 2. The horizontal angle and the vertical angle are determined with reference to the beam direction. At S20, the signal processing unit 4 extracts the plurality of road-surface reflection points from the plurality of reflection points based on at least the reflection point information.

At S210, the signal processing unit 4 identifies the apparatus system coordinates of each road-surface reflection point based on the reflection point information. At S220, the signal processing unit 4 estimates the vertical axial misalignment angle θp and the mounting height H using the relational expression (that is, expressions (1) to (3)). Expression (1) is a relational expression that is established between two unknown parameters (that is, the vertical axial misalignment angle θp and the mounting height H) and two elements (that is, $x_s$ and $z_s$) that are included in the apparatus system coordinates of the road-surface reflection point.

The apparatus system coordinates of each reflection point are accurately detected by the radar apparatus 2. The signal processing unit 4 arithmetically estimates the vertical axial misalignment angle θp that serves as the axial misalignment angle and the mounting height H based on the apparatus system coordinates of the road-surface reflection points.

Conventionally, there has been no technology for simultaneously estimating the axial misalignment angle and the mounting height.

The signal processing unit 4 can simultaneously estimate the vertical axial misalignment angle θp that serves as the axial misalignment angle and the mounting height H. Consequently, the signal processing unit 4 can estimate the height misalignment amount D that is based on the axial misalignment angle and the mounting height H. In addition, the signal processing unit 4 can correct both the vertical axial misalignment angle θp and the mounting height H.

Here, in a conventional apparatus (hereafter, a comparison apparatus) that estimates the axial misalignment angle based on reception strength of a reflected wave from near a vehicle being highest when axial misalignment occurs, misalignment of the mounting height H is assumed to have not occurred. That is, the comparison apparatus estimates the axial misalignment angle under an assumption that height misalignment has not occurred when it is fundamentally unclear which of the axial misalignment around an apparatus coordinate axis and the height misalignment has occurred. Therefore, in the comparison apparatus, even if only the height misalignment occurs and the axial misalignment around the apparatus coordinate axis does not occur, the axial misalignment angle around the apparatus coordinate axis may be estimated. That is, in the comparison apparatus, estimation error of the axial misalignment angle may occur.

Because the signal processing unit 4 estimates both the axial misalignment angle and the mounting height, the mounting height can be estimated and estimation error of the axial misalignment angle can be suppressed.

(1b) The two elements (that is, $x_s$ and $z_s$) that are included in the apparatus system coordinates described above are elements that are related to the two coordinate axes (that is, the front/rear axis Xs and the up/down axis Zs) of the radar apparatus 2 that are included in the plane that is perpendicular to the corresponding axis among the three coordinate axes of the radar apparatus 2. The corresponding axis herein is the left/right axis Ys. The corresponding axis is the coordinate axis of the radar apparatus 2 that corresponds to the target axis (that is, Yc). As a result, because the axial misalignment angle is estimated based on two-dimensional coordinates, processing load on the signal processing unit 4 can be reduced from that when the apparatus system coordinates that are three-dimensional coordinates are used.

(1c) At S110, the signal processing unit 4 may be configured to acquire the detection results of the state of the own vehicle VH from the onboard sensor group 3 that detects the state of the own vehicle VH, and determine whether the vehicle body of the own vehicle VH is stable relative to the road surface based on the detection results. Then, when determined that the vehicle body of the own vehicle VH is stable relative to the road surface, at S20, the signal processing unit 4 may be configured to extract at least one road-surface reflection point among the plurality of reflection points. As a result, a reflection point on a road surface that is not planar, such as a sloped surface or an uneven surface, is not easily extracted as the road-surface reflection point. That is, the reflection point on a flat road surface is more easily extracted as the road-surface reflection point. Therefore, the axial misalignment angle can be accurately estimated based on the road-surface reflection points being positioned on a same plane.

(1d) At S130, the signal processing unit 4 may be configured to extract, as the road-surface reflection point, at least a single reflection point that is positioned within the predetermined orientation range that includes the center axis CA of the radar beam in the horizontal direction, among the plurality of reflection points, based on the reflection point information. Consequently, because the road surface is considered to be present at least near an area directly ahead in the moving direction (that is, the direction of the center axis CA of the radar beam) of the own vehicle VH, as a result of the predetermined orientation range being appropriately prescribed, accuracy in extracting the acquired reflection point on the road surface can be improved.

(1e) At S140, the signal processing unit 4 may be configured to extract, as the road-surface reflection point, at least a single reflection point of which the distance from the radar apparatus 2 is less than the distance threshold, among the plurality of reflection points, based on the reflection point information. Consequently, because the road surface is considered to be positioned at least directly near the own vehicle VH, as a result of the distance threshold being appropriately prescribed, accuracy in extracting the reflection point on the road surface can be further improved.

(1f) The reflection point information may include the relative speed of the reflection point to the own vehicle VH. At step S150, the signal processing unit 4 may be configured to extract, as the road-surface reflection point, at least a single reflection point that is a stationary reflection point among the plurality of reflection points, based on the reflection point information. Consequently, because the road surface is stationary relative to the own vehicle VH, accuracy in extracting the reflection point on the road surface can be further improved.

(1g) The reflection point information may include the reception strength of the reflection point. At S160, the signal processing unit 4 may be configured to extract, as the road-surface reflection point, at least a single reflection point of which the reflection power is less than the power threshold, based on the reflection point information. Consequently, because the reflection power from the road surface is considered to be less than, for example, the reflection power from another vehicle, as a result of the power threshold being appropriately set based on the reflection power from the road surface, accuracy in extracting the reflection point on the road surface can be further improved.

(1h) The signal processing unit 4 may be configured to acquire a captured image from the camera and estimate the orientation range that is identified as being the road surface in the captured image. At S170, the signal processing unit 4 may be configured to extract, as the road-surface reflection point, at least a single reflection point that is in the orientation range that is estimated to be the road surface in the captured image, among the plurality of reflection points. Consequently, accuracy in extracting the road-surface reflection point can be further improved.

Here, according to the above-described embodiment, the coordinate axes of the own vehicle VH correspond to the coordinate axes of the moving body. In addition, the vertical axial misalignment angle θp corresponds to the axial misalignment angle. The vertical axial misalignment angle θp and the mounting height H correspond to the two unknown parameters and at least two unknown parameters that include the axial misalignment angle, and $x_s$ and $z_s$ correspond to the two elements and at least two elements that are included in apparatus system coordinates. The horizontal axis Yc corresponds to the target axis. The left/right axis Ys corresponds to the corresponding axis. The two coordinate axes of the radar apparatus 2 that are included in the plane that is perpendicular to the corresponding axis correspond to the front/rear axis Xs and the up/down axis Zs.

1-4. Modifications (First modification) In a first modification, the signal processing unit 4 may estimate the roll angle θr as the axial misalignment angle, instead of the vertical axial misalignment angle θp. Specifically, instead of the calculation process shown in FIG. 10, the signal processing unit 4 may perform a calculation process shown in FIG. 12. In the calculation process shown in FIG. 12, S220 in FIG. 10 is replaced by S230.

Figure 10:
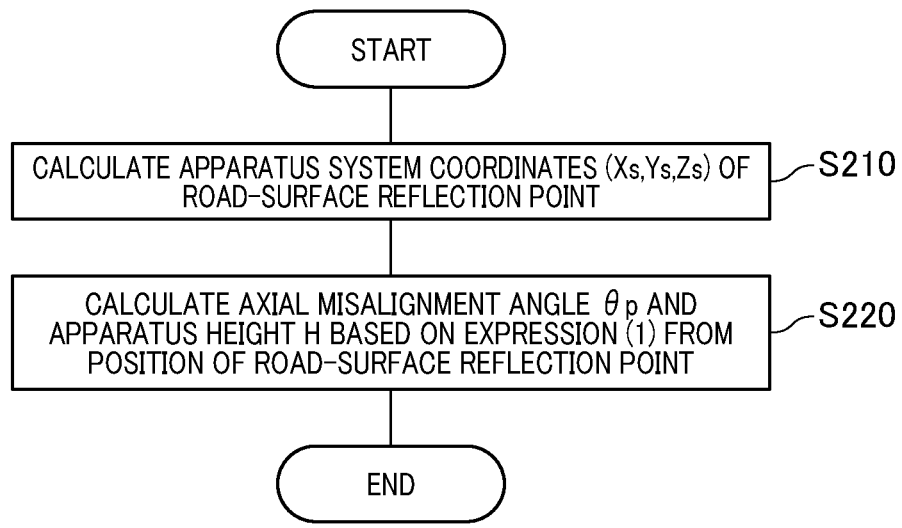
FIG. 10 is a flowchart illustrating a calculation process according to the first embodiment.

At S210, in a manner similar to S210 shown in FIG. 10, the signal processing unit 4 identifies the apparatus system coordinates of each road-surface reflection point based on the reflection point information.

At S230, the signal processing unit 4 estimates the roll angle θr that serves as the axial misalignment angle and the mounting height H. Specifically, the signal processing unit 4 performs the estimation using a relational expression (that is, expression (10)). The relational expression (that is, expression (10)) is a relational expression that is established between the roll angle θr that is an unknown parameter, the mounting height H of the radar apparatus 2 that is an unknown parameter, and two elements (that is, $y_s$ and $z_s$) that are included in the apparatus system coordinates.

$$\begin{bmatrix} \tan\theta_r \\ \dfrac{H}{\cos\theta_r} \end{bmatrix} = (A^T A)^{-1} A^T B \quad (10)$$

Where $$\left. \begin{array}{l} A = [y_s \ 1] \\ B = [-z_s] \end{array} \right\} \quad (11)$$

Here, A and B in expression (10) are as shown in expression (11). Here, $y_s$ and $z_s$ in expression (11) are as shown in expression (3).

The signal processing unit 4 calculates the roll angle θr and the mounting height H based on expression (10). The signal processing unit 4 stores the calculated roll angle θr and mounting height H in the memory 42 and ends the present calculation process.

Figure 13:
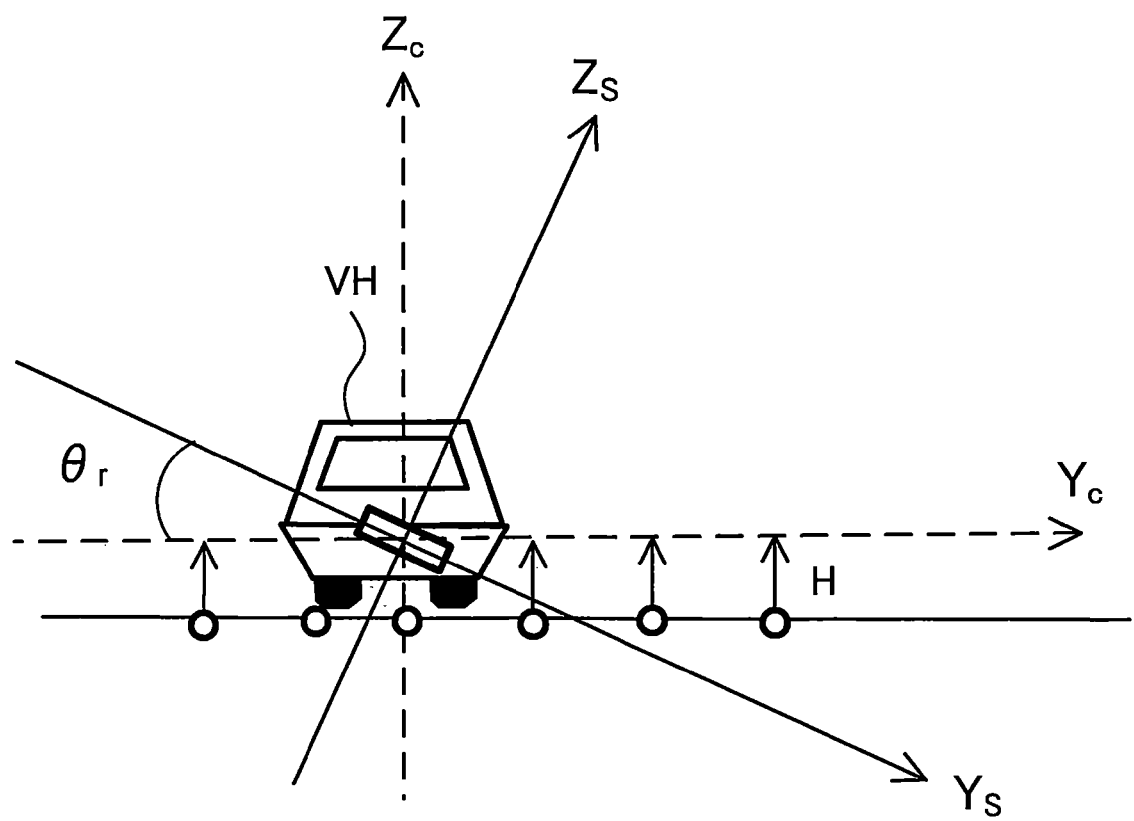
FIG. 13 is an explanatory diagram for explaining principles for estimating the roll angle in the first modification.

Here, as shown in FIG. 13, the road-surface reflection points are positioned on a same plane that is the road surface.

Therefore, the plurality of road-surface reflection points are considered to be linearly arrayed on a projection plane (that is, a Ys-Zs plane) that is perpendicular to the front/rear axis Xs. In a manner similar to above-described expressions (4) to (9), the relational expression (that is, expression (10)) can be obtained by the vertical axial misalignment angle θp in above-described expressions (4) to (9) being replaced by the roll angle θr and $x_s$ being replaced by $y_s$.

In this manner, the signal processing unit 4 that is the axial misalignment estimation apparatus in the first modification sets the moving-direction axis Xc as the target axis, and the roll angle θr that is the axial misalignment angle around the moving-direction axis Xc and the mounting height H as the unknown parameters. In addition, the signal processing unit 4 sets $x_s$ and $y_s$ of the apparatus system coordinates of the road-surface reflection point as the two elements. In the signal processing unit 4, the estimating unit 46 is configured to determine the roll angle θr and the mounting height H from calculation based on the above-described expressions (10), (11), and (3).

Consequently, the signal processing unit 4 can simultaneously estimate the roll angle θr that serves as the axial misalignment angle and the mounting height H.

Here, in the first modification, the roll angle θr corresponds to the axial misalignment angle. The roll angle θr and the mounting height H correspond to the two unknown parameters and the at least two unknown parameters that include the axial misalignment angle, and $y_s$ and $z_s$ correspond to the two elements and the at least two elements that are included in the apparatus system coordinates. The front/rear axis Xs corresponds to the target axis. The two coordinate axes of the radar apparatus 2 that are included in the plane that is perpendicular to the target axis correspond to the left/right axis Ys and the up/down axis Zs.

Figure 12:
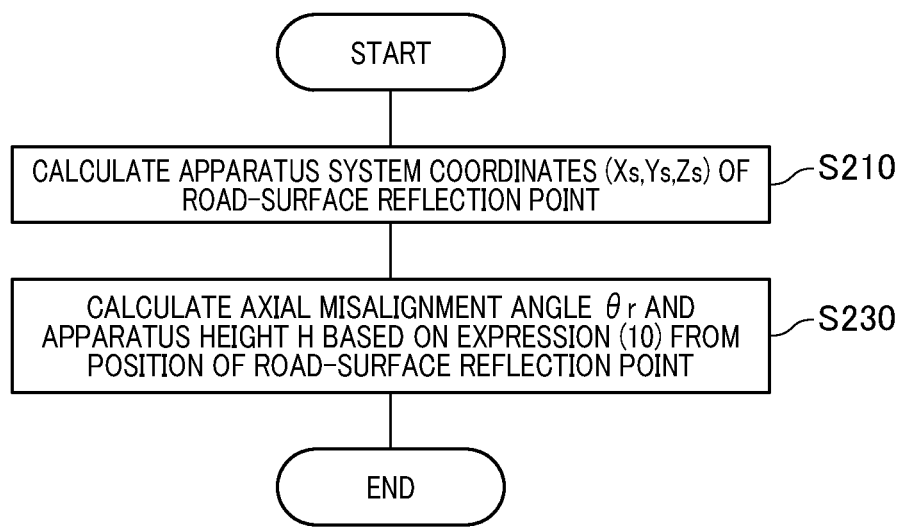
FIG. 12 is a flowchart illustrating the calculation process in a first modification.

(Second modification) The signal processing unit 4 may estimate the vertical axial misalignment angle θp, the roll angle θr, and the mounting height H with the vertical axial misalignment angle θp and the roll angle θr as the axial misalignment angle. Specifically, the signal processing unit 4 may perform a process in which S230 of the calculation process shown in FIG. 12 is added after S220 of the calculation process shown in FIG. 10. Here, as the mounting height H, an average value of the values that are respectively calculated based on S220 and S230 may be used.

Figure 14:
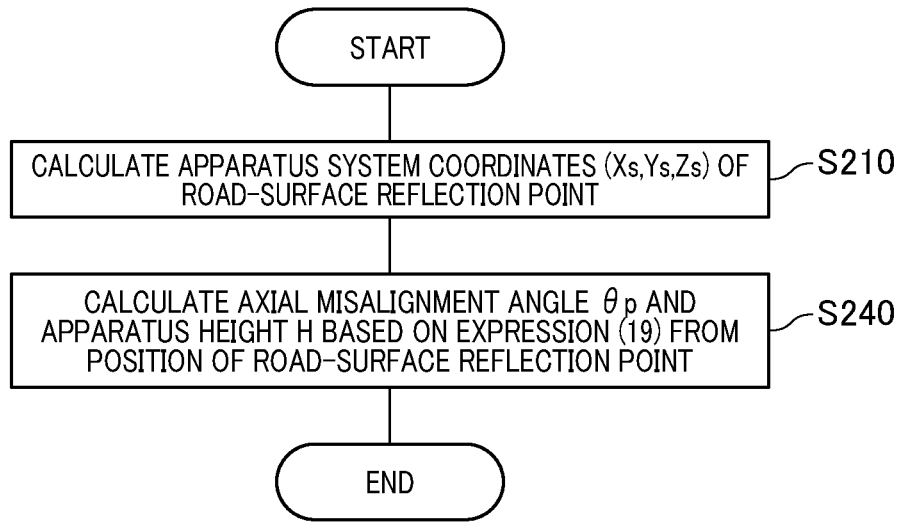
FIG. 14 is a flowchart illustrating the calculation process in a third modification.

(Third modification) The signal processing unit 4 may estimate the vertical axial misalignment angle θp, the roll angle θr, and the mounting height H with the vertical misalignment angle θp and the roll angle θr as the axial misalignment angle by a calculation method other than that in (second modification). Specifically, the signal processing unit 4 may perform the calculation process shown in FIG. 14 instead of the calculation process shown in FIG. 10. In the calculation process shown in FIG. 14, S220 in FIG. 10 is replaced by S240.

At S240, the signal processing unit 4 estimates the vertical axial misalignment angle θp and the roll angle θr as the axial misalignment angle, and the mounting height H. Specifically, the signal processing unit 4 performs estimation using a relational expression (that is, expression (12)). The relational expression (that is, expression (12)) is a relational expression that is established between the vertical axial misalignment angle θp that is an unknown parameter, the roll angle θr that is an unknown parameter, the mounting height H of the radar apparatus 2 that is an unknown parameter, and three elements (that is, $x_s$, $y_s$, and $z_s$) that are included in the apparatus system coordinates.

$$[X_s \; -Y_S \; 1] = \begin{bmatrix} \tan\theta_p \\ \tan\theta_r \\ \cos\theta_p \\ \dfrac{H}{\cos\theta_r\cos\theta_p} \end{bmatrix} = [-Z_S] \quad (12)$$

The signal processing unit 4 calculates the vertical axial misalignment angle θp, the roll angle θr, and the mounting height H based on expression (12). The signal processing unit 4 stores the calculated vertical axial misalignment angle θp, roll angle θr, and mounting height H in the memory 42, and ends the present calculation process.

Figure 15:
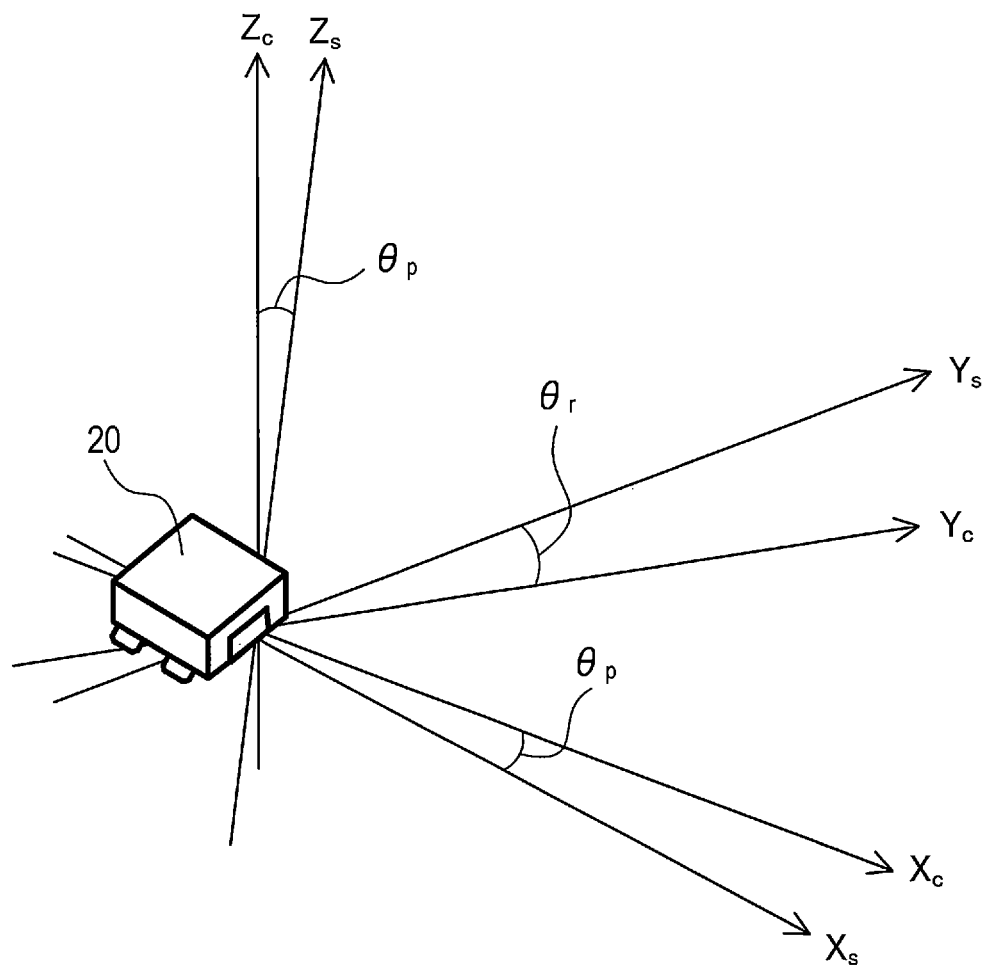
FIG. 15 is an explanatory diagram of principles for estimating the vertical axial misalignment angle and the roll angle in the third modification.

Here, as shown in FIG. 15, expression (12) can be obtained based on the coordinate axes of the radar apparatus 2 coinciding with the coordinate axes of the own vehicle VH by being rotated around the left/right axis Ys by an amount amounting to the vertical axial misalignment angle θp, and around the front/rear axis Xs by an amount amounting to the roll angle θr. That is, expression (13) to expression (14) are obtained.

$$\begin{bmatrix} X_C \\ Y_C \\ Y_C \end{bmatrix} = \begin{bmatrix} 1 & 0 & 0 \\ 0 & \cos(-\theta_r) & -\sin(-\theta_r) \\ 0 & \sin(-\theta_r) & \cos(-\theta_r) \end{bmatrix} \begin{bmatrix} \cos(-\theta_p) & 0 & \sin(-\theta_p) \\ 0 & 1 & 0 \\ -\sin(-\theta_p) & 0 & \cos(-\theta_p) \end{bmatrix} \begin{bmatrix} X_S \\ Y_S \\ Y_S \end{bmatrix} \quad (13)$$

$$= \begin{bmatrix} \cos\theta_p & 0 & -\sin(\theta_p) \\ \sin\theta_r\sin\theta_p & \cos\theta_r & \sin\theta_r\cos\theta_p \\ \cos\theta_r\sin\theta_p & -\sin\theta_r & \cos\theta_p\sin\theta_p \end{bmatrix} \begin{bmatrix} X_S \\ Y_S \\ Z_S \end{bmatrix} \quad (14)$$

Here, expression (15) is obtained from the relational expression expressed by expression (5) and expression (14) described above. In addition, as a result of expression (15) being divided by (cos θr cos θp), expression (16) can be obtained. Then, expression (12) is derived from expression (16).

$$[Z_C] = [\cos\theta_r\sin\theta_p X_S - \sin\theta_r Y_S + \cos\theta_r\cos\theta_p Z_S] = [-H] \quad (15)$$

$$\left[\tan\theta_p X_S - \frac{\tan\theta_r}{\cos\theta_p} Y_S + Z_S\right] = \left[-\frac{H}{\cos\theta_r\cos\theta_p}\right] \quad (16)$$

Consequently, the signal processing unit 4 can simultaneously estimate the vertical axial misalignment angle θp and the roll angle θr that are the axial misalignment angles and the mounting height H.

2. Second Embodiment

2-1. Configuration

A basic configuration according to a second embodiment is similar to that according to the first embodiment. Therefore, differences will be described below. Here, reference numbers that are same as those according to the first embodiment indicate identical configurations. Foregoing descriptions are referenced.

According to the first embodiment, the axial misalignment angle and the mounting height H are estimated based on the position of the road-surface reflection point. In contrast, the second embodiment differs from the first embodiment in that a road-surface flatness level Wc is calculated. Weighting based on the road-surface flatness level Wc is performed and the axial misalignment angle and the mounting height H are estimated based on the position of the road-surface reflection point. The road-surface flatness level Wc is a numeric value that indicates a degree of flatness of the road surface. Here, the road-surface flatness level Wc is expressed by a larger numeric value as the road surface becomes flatter.

2-2. Processes

2-2-1. Axial Misalignment Estimation Process

Figure 16:
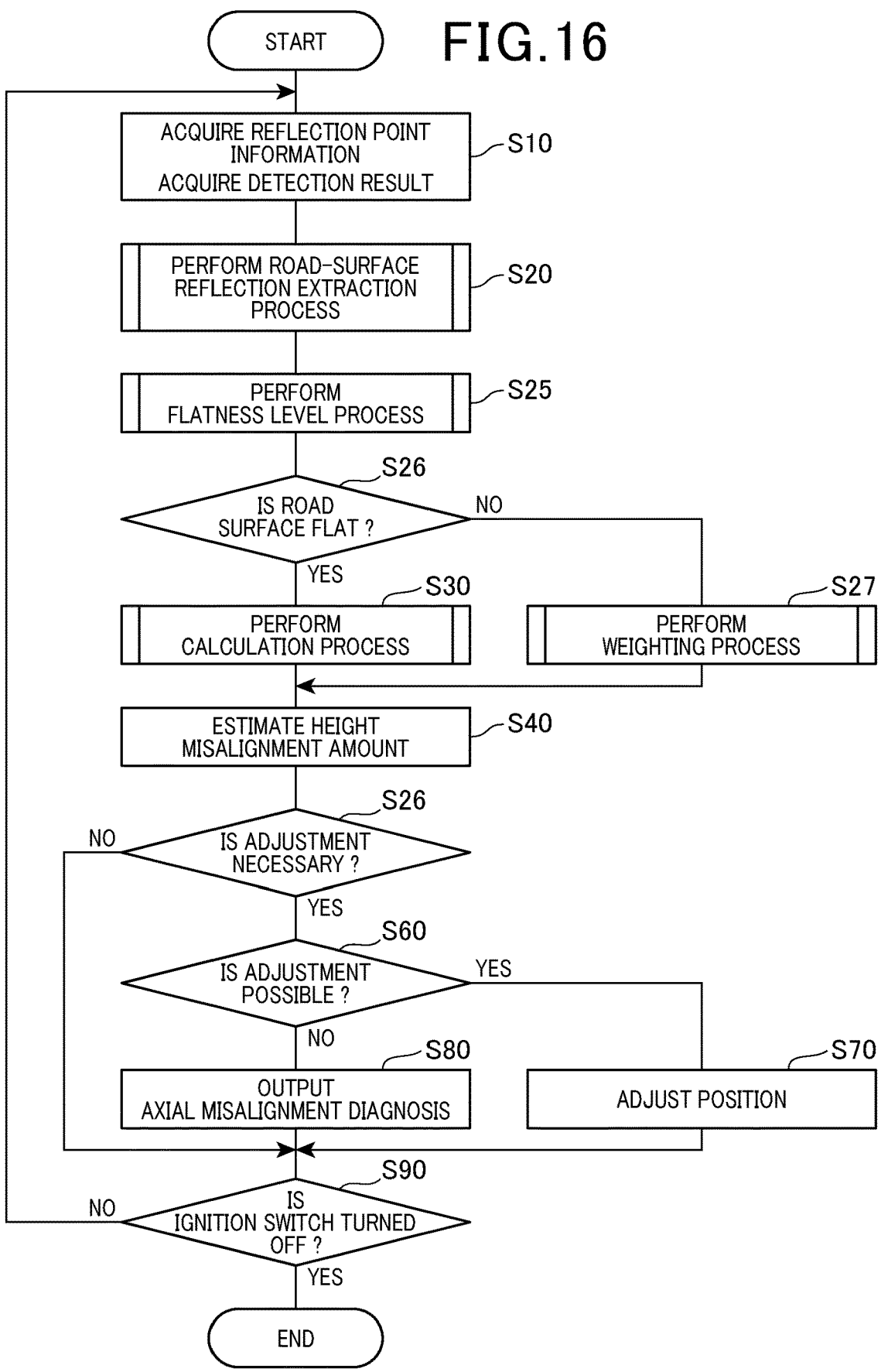
FIG. 16 is a flowchart illustrating an axial misalignment estimation process according to a second embodiment.

Next, an axial misalignment estimation process performed by the signal processing unit 4 according to the second embodiment instead of the axial misalignment estimation process according to the first embodiment shown in FIG. 8 will be described with reference to a flowchart in FIG. 16. Here, processes in FIG. 16 other than those at S25 to S27 are similar to the processes at S10 to S20 and S30 to S90 in FIG. 8. Therefore, description is partially simplified.

At S25 following S20, the signal processing unit 4 performs a flatness level process described hereafter and calculates the road-surface flatness level Wc.

At a flatness determining unit S26, the signal processing unit 4 determines whether the road surface is flat based on the road-surface flatness level Wc. Specifically, the signal processing unit 4 determines that the road surface is flat when the road-surface flatness level Wc is equal to or greater than a flatness threshold WT that is prescribed in advance. The flatness threshold WT is stored in the memory 42 in advance.

Here, when determined that the road surface is flat, the signal processing unit 4 shifts the process to S30. At S30 and subsequent steps, the signal processing unit 4 performs processes that are similar to the processes shown in FIG. 8. Meanwhile, when determined that the road surface is not flat, the signal processing unit 4 shifts the process to S27.

At S27, the signal processing unit 4 performs a weighting process described hereafter. Furthermore, the signal processing unit 4 performs weighting based on the road-surface flatness level Wc and estimates the vertical axial misalignment angle θp and the mounting height H based on the above-described relational expression. Then, the signal processing unit 4 shifts the process to S40. At S40 and subsequent steps, the signal processing unit 4 performs processes that are similar to the processes shown in FIG. 8.

2-2-2. Flatness Level Process

The flatness level process performed by the signal processing unit 4 at S25 of the axial misalignment estimation process shown in FIG. 16 will be described with reference to a flowchart in FIG. 17.

At S310, the signal processing unit 4 acquires an output value of the acceleration sensor and calculates a first coefficient W1 based on the output value. The first coefficient W1 is a numeric value that indicates the flatness level of the road surface and is calculated such as to decrease as the output value of the acceleration sensor increases. For example, the first coefficient W1 that corresponds to the output value of the acceleration sensor may be stored in the memory 42 in table format. The signal processing unit 4 may reference information in the table format and calculate the first coefficient W1 that corresponds to the output value of the acceleration sensor.

At S320, the signal processing unit 4 acquires a value of the reflection power of each of the plurality of road-surface reflection points and calculates a second coefficient W2 based on variations in reflection power. The second coefficient W2 is a numeric value that indicates the flatness level of the road surface and is calculated such as to decrease as an index that indicates the variation in the reflection power increases. For example, the signal processing unit 4 may use standard deviation or distribution of the reflection power as the index that indicates the variation. For example, information in table format that indicates correspondence between the index that indicates the variation and the second coefficient W2 may be stored in the memory 42. The signal processing unit 4 may reference the table and calculate the second coefficient W2 that corresponds to the index that indicates the variation.

At S330, the signal processing unit 4 acquires a current position of the own vehicle VH from the navigation apparatus and calculates a third coefficient W3 based on the current position of the own vehicle VH and the map information. The third coefficient W3 is a numeric value that indicates the flatness level of the road surface. The third coefficient W3 is included in the map information and is expressed by a value that increases as the road surface becomes flatter. The signal processing unit 4 may acquire the flatness level of the road surface of the road in the current position of the own vehicle VH based on the map information and use the acquired flatness level as the third coefficient W3.

At S340, the signal processing unit 4 acquires a captured image from the camera and calculates a fourth coefficient W4 based on the captured image. The fourth coefficient W4 is a numeric value that indicates the flatness level of the road surface and is based on the captured image. The fourth coefficient W4 is expressed by a value that increases as the road surface becomes flatter. The captured image herein includes the road surface ahead of the own vehicle VH. Using an identifier in which learning for estimating the flatness level of a road surface that is included in a plurality of images from the plurality of images that include the road surface is performed in advance, the signal processing unit 4 may estimate the flatness level of the road surface that is included in the acquired captured image and use the estimated flatness level as the fourth coefficient W4.

At S350, the signal processing unit 4 calculates the road-surface flatness level Wc using the first coefficient W1 to fourth coefficient W4. The signal processing unit 4 stores an average value of the first coefficient W1 to fourth coefficient W4 as the road-surface flatness level Wc in the memory 42. The signal processing unit 4 thereby ends the flatness process. However, the present disclosure is not limited thereto. The signal processing unit 4 may use a maximum value, a median value, or the like of the first coefficient W1 to fourth coefficient W4 as the road-surface flatness level Wc and store the road-surface flatness level Wc in the memory 42.

2-2-3. Weighting Process

The weighting process performed by the signal processing unit at S27 of the axial misalignment estimation process shown in FIG. 16 will be described with reference to a flowchart in FIG. 18. The weighting process is repeatedly performed every time the process shifts to S27 in the axial misalignment estimation process. Here, a series of processes from first to last in the weighting process is also referred to as a "cycle."

At S410, in a manner similar to that at S210, the signal processing unit 4 calculates the apparatus system coefficients of the road-surface reflection point in a current cycle. Here, respective $x_s$, $y_s$, and $z_s$ of each of the plurality (that is, the n number) of road-surface reflection points are expressed as in expression (3) described above.

At S420 to S470, the signal processing unit 4 performs calculation to perform weighting based on the road-surface flatness level Wc on a right side of expression (1) described above. As a result, a left side of expression (1), that is, the vertical axial misalignment angle θp and the mounting height H after weighting based on the road-surface flatness level Wc are estimated.

First, at step S420, the signal processing unit 4 calculates parameters Ma and Mb for calculating the right side of expression (1) from the apparatus system coordinates of the road-surface reflection point in the current cycle as in expressions (17) and (18).

$$Ma = A^T A \quad (17)$$

$$Mb = A^T B \quad (18)$$

Here, parameters A and B are as shown in expression (2) described above. The parameter Ma is a 2×2 matrix and the parameter Mb is a 2×1 matrix.

At S430, the signal processing unit 4 acquires the road-surface flatness level Wc of the current cycle.

At S440, the signal processing unit 4 calculates weighted parameters Mwa and Mwb of the current cycle as in expressions (19) and (20). The weighted parameter Mwa of the current cycle is obtained by the parameter Ma of the current cycle being multiplied by the road-surface flatness level Wc of the current cycle. The weighted parameter Mwb of the current cycle is obtained by the parameter Mb of the current cycle being multiplied by the road-surface flatness level Wc of the current cycle.

$$Mwa = wc \times Ma \quad (19)$$

$$Mwb = wc \times Mb \quad (20)$$

At S450, the signal processing unit 4 stores a total weighted parameter Mcwa of the current cycle in the memory 42. The total weighted parameter Mcwa of the current cycle is obtained by a past total weighted parameter Mdcwa that is stored in the memory 42 being added to the weighted parameter Mwa of the current cycle as in expression (21). In a similar manner, the signal processing unit 4 stores a total weighted parameter Mcwb of the current cycle in the memory 42. The total weighted parameter Mcwb of the current cycle is obtained by a past total weighted parameter Mdcwb that is stored in the memory 42 being added to the weighted parameter Mwb of the current cycle as in expression (22). Past herein refers to that used in a previous cycle.

$$Mcwa = Mwa + Mdcwa \quad (21)$$

$$Mcwb = Mwb + Mdcwb \quad (22)$$

At S460, the signal processing unit 4 estimates the vertical axial misalignment angle θp and the mounting height H after weighting based on the road-surface flatness level Wc based on expression (23), using the total weighted parameters Mcwa and Mcwb of the current cycle. The signal processing unit 4 stores the estimated vertical axial misalignment angle θp and mounting height H in the memory 42.

$$\begin{bmatrix} \tan\theta_p \\ \dfrac{H}{\cos\theta_p} \end{bmatrix} = (Mcwa)^1 \times Mcwb \quad (23)$$

At S470, the signal processing unit 4 stores the total weighted parameter Mcwa of the current cycle in the memory 42 as the past total weighted parameter Mdcwa. In addition, the signal processing unit 4 stores the total weighted parameter Mcwb of the current cycle in the memory 42 as the past total weighted parameter Mdcwb. The signal processing unit 4 thereby ends the weighting process.

2-3. Effects

According to the second embodiment described in detail above, following effects are achieved.

(2a) At S25, the signal processing unit 4 calculates the road-surface flatness level Wc. At S26, the signal processing unit 4 determines whether the road surface is flat based on the road-surface flatness level Wc. When determined that the road surface is not flat, the signal processing unit 4 performs weighting based on the road-surface flatness level Wc (that is, using expression (23)) and estimates the axial misalignment angle θp and the mounting height H based on the relational expression (that is, expressions (1) to (3)).

As the road-surface flatness level Wc increases, that is, as the road becomes flatter, the number of road-surface reflection points at this time increases, and the axial misalignment angle θp and the mounting height H are estimated. In other words, weighting being performed corresponds to the axial misalignment angle θp and the mounting height H being estimated using a greater number of road-surface reflection points as the road surface becomes flatter. Consequently, the axial misalignment angle θp and the mounting height H that are weighted based on the road-surface flatness level Wc can be estimated.

2-4. Modifications (Fourth modification) According to the second embodiment, the axial misalignment angle θp and the mounting height H that are weighted based on the road-surface flatness level Wc are estimated. However, the present disclosure is not limited thereto. The signal processing unit 4 may estimate the roll angle θr and the mounting height H that are weighted based on the road-surface flatness level Wc in a manner similar to that according to the second embodiment, based on expressions (10) to (11) and (3) instead of expressions (1) to (3).

(Fifth modification) The signal processing unit 4 may estimate the pitch angle θp, the roll angle θr, and the mounting height H that are weighted based on the road-surface flatness level Wc. For example, the signal processing unit 4 may calculate the axial misalignment angle θp and the mounting height H that are weighted based on the road-surface flatness level Wc as described above, based on expressions (1) to (3). Furthermore, the signal processing unit 4 may estimate the roll angle θr and the mounting height H that are weighted based on the road-surface flatness level Wc, based on expressions (10) to (11). Here, as the mounting height H, an average value of values that are respectively calculated by weighting being performed based on expressions (1) to (3) and expressions (10) and (11) may be used.

3. Other Embodiments

Embodiments of the present disclosure are described above. However, the present disclosure is not limited to the above-described embodiments and can be modified in various ways.

(3a) According to the above-described embodiment, an example in which the radar apparatus 2 transmits the radar waves ahead of the own vehicle VH is described. However, a transmission direction of the radar waves is not limited to ahead of the own vehicle VH. For example, the radar apparatus 2 may be configured to transmit the radar waves towards at least any one of a front side, a front right side, a front left side, a rear side, a rear right side, a rear left side, a right side, and a left side of the own vehicle VH.

(3b) According to the above-described embodiment, an example in which the radar apparatus 2 uses the FMCW system is described. However, a radar system of the radar apparatus 2 is not limited to FMCW and, for example, may be configured to use two-frequency CW, FCM, or pulses. FCM is an abbreviation of Fast-Chirp Modulation.

(3c) According to the above-described embodiments, an example in which the signal processing unit 4 performs the axial misalignment estimation process is given. However, the radar apparatus 2 may be configured to perform the axial misalignment estimation process.

(3d) The signal processing unit 4 and the method thereof described in the present disclosure may be actualized by a dedicated computer that is provided such as to be configured by a processor and a memory, the processor being programmed to provide one or a plurality of functions that are realized by a computer program. Alternatively, the signal processing unit 4 and the method thereof described in the present disclosure may be actualized by a dedicated computer that is provided by a processor being configured by a single dedicated hardware logic circuit or more. Still alternatively, the signal processing unit 4 and the method thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory, tangible recording medium that can be read by a computer as instructions performed by the computer. A method for actualizing functions of sections that are included in the signal processing unit 4 is not necessarily required to include software. All of the functions may be actualized using a single or a plurality of pieces of hardware.

(3e) A plurality of functions provided by a single constituent element according to the above-described embodiments may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element. Furthermore, a part of a configuration according to the above-described embodiments may be omitted. Moreover, at least a part of a configuration according to an above-described embodiment may be added to or replace a configuration according to another of the above-described embodiments.

(3f) The present disclosure can also be actualized by various modes in addition to the above-described signal processing unit 4, radar apparatus 2, and vehicle control system 1, such as a program for enabling function as the signal processing unit 4, a non-transitory, tangible recording medium such as a semiconductor memory that records the program therein, and an axial misalignment estimation method.

Here, according to the above-described embodiments, the own vehicle VH corresponds to the moving body. The signal processing unit 4 and the estimating unit 46 correspond to the axial misalignment estimation apparatus. In addition, S10 corresponds to a process as an acquiring unit. S20 corresponds to a process as an extracting unit. S30 and S210 correspond to a process as an apparatus system coordinate unit. S30, S220, S230, and S240 correspond to a process as the estimating unit 46. In addition, S25 corresponds to a process as a flatness level calculating unit. S26 corresponds to a process as a flatness determining unit. S27 corresponds to a process as a weighting processing unit.

What is claimed is:

1. An axial misalignment estimation apparatus that is mounted in a moving body, the axial misalignment estimation apparatus comprising:
   an acquiring unit that is configured to acquire, for each of a plurality of reflection points that are detected by a radar apparatus, reflection point information that includes at least a horizontal angle and a vertical angle that are an orientation angle of the reflection point and determined with reference to a beam direction that is a direction along a center axis of a radar beam, and a distance between the radar apparatus and the reflection point;
   an extracting unit that is configured to extract, from the plurality of reflection points, a plurality of road-surface reflection points that are detected by reflection on a road surface based on at least the reflection point information;
   a flatness level calculating unit that is configured to calculate a road-surface flatness level that is a numeric value that indicates a degree of flatness of the road surface;
   a flatness determining unit that is configured to determine whether the road surface is flat based on the road-surface flatness level;
   a coordinate system coordinate unit that is configured to identify, for each road-surface reflection point, apparatus system coordinates that are three-dimensional coordinates that are based on coordinate axes of the radar apparatus based on the reflection point information; and
   an estimating unit that is configured to estimate an axial misalignment angle of the radar apparatus and a height of the radar apparatus using a relational expression that is established between at least two unknown parameters and at least two elements,
      the at least two unknown parameters including the axial misalignment angle that is a misalignment angle of a coordinate axis of the radar apparatus around a target axis that is one of a horizontal axis and a moving-direction axis that are coordinate axes of the moving body, and a mounting height of the radar apparatus, and
      the at least two elements being included in the apparatus system coordinates of the road-surface reflection point, wherein:
   the estimating unit includes
      a weighting processing unit that is configured to perform weighting based on the road-surface flatness level using the relational expression and estimate the axial misalignment angle and the mounting height of the radar apparatus, in response to the flatness determining unit determining that the road surface is not flat, and
   the estimating unit adjusts, by an adjustment apparatus mounted to the radar apparatus, a mounting angle of the radar apparatus and the mounting height of the radar apparatus, based on the estimated axial misalignment angle of the radar apparatus and the estimated height of the radar apparatus.

2. The axial misalignment estimation apparatus according to claim 1, wherein:
   the horizontal axis is the target axis, a vertical axial misalignment angle $\theta p$ that is the axial misalignment angle around the horizontal axis and the mounting height H are the unknown parameters, and $x_s$ and $z_s$ of the apparatus system coordinates $(x_s, y_s, z_s)$ of the road-surface reflection point are the two elements that are included in the apparatus system coordinates; and
   the estimating unit is configured to determine the vertical axial misalignment angle $\theta p$ and the mounting height H through calculation based on the relational expression shown in expression (1) to expression (3) below:

$$\begin{bmatrix} \tan\theta_p \\ \dfrac{H}{\cos\theta_p} \end{bmatrix} = (A^T A)^{-1} A^T B \quad (1)$$

Where $$\left. \begin{array}{l} A = [x_s \ \ 1] \\ B = [-z_s] \end{array} \right\} \quad (2)$$

Here $$\left. \begin{array}{l} x_s = [x_{s1}, \ x_{s2}, \ \cdots \ x_{sn}]^T \\ y_s = [y_{s1}, \ y_{s2}, \ \cdots \ y_{sn}]^T \\ z_s = [z_{s1}, \ z_{s2}, \ \cdots \ z_{sn}]^T \end{array} \right\} \quad (3)$$

3. The axial misalignment estimation apparatus according to claim 1, wherein:
   the reflection point information includes a relative speed of each of the plurality of reflection points detected by the radar apparatus; and
   the extracting unit
      acquires a speed of the moving body,
      identifies, as a stationary reflection point, a reflection point that satisfies $\varepsilon_1 \leq q/Cm < \varepsilon_2$, where Cm is an acquired speed of the moving body, q is a relative speed of each of the plurality of reflection points detected by the radar apparatus, $\varepsilon_1$ is a predetermined upper-limit speed threshold, and $\varepsilon 2$ is a predetermined lower-limit speed threshold, and
      extracts, as the road-surface reflection point, at least the reflection point identified as the stationary reflection point from the plurality of reflection points detected by the radar apparatus.

4. The axial misalignment estimation apparatus according to claim 1, wherein:
   each of the horizontal axis and the moving-direction axis is the target axes, a vertical axial misalignment angle $\theta p$ that is the axial misalignment angle around the horizontal axis, a roll angle $\theta r$ that is the axial misalignment angle around the moving-direction axis, and the mounting height H are the unknown parameters, and xs, ys, and zs of the apparatus system coordinates (xs, ys, zs) of the road-surface reflection point are the two elements that are included in the apparatus system coordinates; and
   the estimating unit is configured to determine the vertical axial misalignment angle $\theta p$, the roll angle $\theta r$, and the mounting height H through calculation based on the relational expression shown in expression (12) below:

$$[X_S \quad -Y_S \quad 1] = \begin{bmatrix} \tan\theta_p \\ \tan\theta_r \\ \cos\theta_p \\ \dfrac{H}{\cos\theta_r \cos\theta_p} \end{bmatrix} = [-Z_S]. \quad (12)$$

5. The axial misalignment estimation apparatus according to claim 1, wherein:
the moving-direction axis is the target axis, a roll angle θr that is the axial misalignment angle around the moving-direction axis and the mounting height H are the unknown parameters, and $y_s$ and $z_s$ of the apparatus system coordinates ($x_s$, $y_s$, $z_s$) of the road-surface reflection point are the two elements that are included in the apparatus system coordinates; and
the estimating unit is configured to determine the roll angle θr and the mounting height H through calculation based on the relational expression shown in expressions (10), (11), and (3) below:

$$\begin{bmatrix} \tan\theta_r \\ \dfrac{H}{\cos\theta_r} \end{bmatrix} = (A^T A)^{-1} A^T B \quad (10)$$

Where $$\begin{aligned} A &= [y_s \quad 1] \\ B &= [-z_s] \end{aligned} \quad (11)$$

Here $$\begin{aligned} x_s &= [x_{s1}, \ x_{s2}, \ \ldots \ x_{sn}]^T \\ y_s &= [y_{s1}, \ y_{s2}, \ \ldots \ y_{sn}]^T \\ z_s &= [z_{s1}, \ z_{s2}, \ \ldots \ z_{sn}]^T \end{aligned} \quad (3)$$

6. The axial misalignment estimation apparatus according to claim 1, wherein:
the extracting unit is configured to extract the road-surface reflection point in response to the moving body being stable relative to the road surface.

7. The axial misalignment estimation apparatus according to claim 1, wherein:
the extracting unit is configured to extract, as the road-surface reflection point, at least a single reflection point of which a distance from the radar apparatus is less than a distance threshold, among the plurality of reflection points, based on the reflection point information detected by the radar apparatus.

8. The axial misalignment estimation apparatus according to claim 1, wherein:
the extracting unit is configured to extract, at least a single reflection point of which a reflection power is less than a power threshold, among the plurality of reflection points, based on the reflection point information detected by the radar apparatus.

9. The axial misalignment estimation apparatus according to claim 1, wherein:
a camera is mounted to the moving body; and
the extracting unit is configured to
acquire a captured image from the camera,
estimate the orientation range that is identified as being the road surface in the captured image; and
extract, as the road-surface reflection point, at least a single reflection point that is in the orientation range that is estimated to be the road surface in the captured image, among the plurality of reflection points.

10. An axial misalignment estimation apparatus that is mounted in a moving body, the axial misalignment estimation apparatus comprising:
a processor;
a non-transitory computer-readable storage medium; and
a set of computer-executable instructions stored on the computer-readable storage medium that when read and executed by the processor, that cause the processor to implement:
acquiring, for each of a plurality of reflection points that are detected by a radar apparatus, reflection point information that includes at least a horizontal angle and a vertical angle that are an orientation angle of the reflection point and determined with reference to a beam direction that is a direction along a center axis of a radar beam, and a distance between the radar apparatus and the reflection point;
extracting, from the plurality of reflection points, a plurality of road-surface reflection points that are detected by reflection on a road surface based on at least the reflection point information;
calculating a road-surface flatness level that is a numeric value that indicates a degree of flatness of the road surface;
determining whether the road surface is flat based on the road-surface flatness level;
identifying, for each road-surface reflection point, apparatus system coordinates that are three-dimensional coordinates that are based on coordinate axes of the radar apparatus based on the reflection point information; and
estimating an axial misalignment angle of the radar apparatus and a height of the radar apparatus using a relational expression that is established between at least two unknown parameters and at least two elements,
the at least two unknown parameters including the axial misalignment angle that is a misalignment angle of a coordinate axis of the radar apparatus around a target axis that is one of a horizontal axis and a moving-direction axis that are coordinate axes of the moving body, and a mounting height of the radar apparatus, and
the at least two elements being included in the apparatus system coordinates of the road-surface reflection point, wherein:
estimating the axial misalignment angle and the height of the radar apparatus includes
performing weighting based on the road-surface flatness level using the relational expression and estimating the axial misalignment angle of the radar apparatus and the mounting height of the radar apparatus, in response to determining that the road surface is not flat, and
adjusting, by an adjustment apparatus mounted to the radar apparatus, a mounting angle of the radar apparatus of the radar apparatus and the mounting height of the radar apparatus, based on the estimated axial misalignment angle of the radar apparatus and the estimated height of the radar apparatus.

11. An axial misalignment estimation method for a moving body, the axial misalignment estimation method comprising:
acquiring, for each of a plurality of reflection points that are detected by a radar apparatus, reflection point information that includes at least a horizontal angle and a vertical angle that are an orientation angle of the reflection point and determined with reference to a beam direction that is a direction along a center axis of a radar beam, and a distance between the radar apparatus and the reflection point;

extracting, from the plurality of reflection points, a plurality of road-surface reflection points that are detected by reflection on a road surface based on at least the reflection point information;

calculating a road-surface flatness level that is a numeric value that indicates a degree of flatness of the road surface;

determining whether the road surface is flat based on the road-surface flatness level;

identifying, for each road-surface reflection point, apparatus system coordinates that are three-dimensional coordinates that are based on coordinate axes of the radar apparatus based on the reflection point information; and estimating an axial misalignment angle of the radar apparatus and a height of the radar apparatus using a relational expression that is established between at least two unknown parameters and at least two elements, the at least two unknown parameters including the axial misalignment angle that is a misalignment angle of a coordinate axis of the radar apparatus around a target axis that is one of a horizontal axis and a moving-direction axis that are coordinate axes of the moving body, and a mounting height of the radar apparatus, and the at least two elements being included in the apparatus system coordinates of the road-surface reflection point, wherein:

estimating the axial misalignment angle and the height of the radar apparatus includes performing weighting based on the road-surface flatness level using the relational expression and estimating the axial misalignment angle of the radar apparatus and the mounting height of the radar apparatus, in response to determining that the road surface is not flat, and adjusting, by an adjustment apparatus mounted to the radar apparatus, a mounting angle of the radar apparatus and the mounting height of the radar apparatus, based on the estimated axial misalignment angle of the radar apparatus and the estimated height of the radar apparatus.

* * * * *